United States Patent
Apostolopoulos et al.

(10) Patent No.: US 7,558,954 B2
(45) Date of Patent: Jul. 7, 2009

(54) METHOD AND APPARATUS FOR ENSURING THE INTEGRITY OF DATA

(75) Inventors: John Apostolopoulos, Palo Alto, CA (US); Susie Wee, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 729 days.

(21) Appl. No.: 10/698,784

(22) Filed: Oct. 31, 2003

(65) Prior Publication Data

US 2005/0097361 A1     May 5, 2005

(51) Int. Cl.
    H04L 9/00    (2006.01)
(52) U.S. Cl. .................... 713/161; 713/168
(58) Field of Classification Search ............. 713/161, 713/168
    See application file for complete search history.

(56) References Cited

U.S. PATENT DOCUMENTS

| | | | | | |
|---|---|---|---|---|---|
| 4,790,028 | A | * | 12/1988 | Ramage | 382/298 |
| 5,321,807 | A | * | 6/1994 | Mumford | 345/543 |
| 5,790,669 | A | * | 8/1998 | Miller et al. | 705/80 |
| 5,850,451 | A | * | 12/1998 | Sudia | 380/286 |
| 5,958,080 | A | * | 9/1999 | Kang | 714/807 |
| 6,065,008 | A | | 5/2000 | Simon et al. | |
| 6,320,599 | B1 | * | 11/2001 | Sciammarella et al. | 345/667 |
| 6,396,805 | B2 | * | 5/2002 | Romrell | 370/216 |
| 6,571,334 | B1 | * | 5/2003 | Feldbau et al. | 713/170 |
| 6,804,257 | B1 | * | 10/2004 | Benayoun et al. | 370/471 |
| 6,954,775 | B1 | * | 10/2005 | Shanklin et al. | 718/105 |
| 2001/0029581 | A1 | | 10/2001 | Knauft | |
| 2002/0095586 | A1 | * | 7/2002 | Doyle et al. | 713/186 |
| 2002/0157005 | A1 | * | 10/2002 | Brunk et al. | 713/176 |
| 2002/0163911 | A1 | * | 11/2002 | Wee et al. | 370/389 |
| 2002/0166070 | A1 | * | 11/2002 | Mualem et al. | 713/201 |
| 2003/0159036 | A1 | * | 8/2003 | Walmsley et al. | 713/168 |

OTHER PUBLICATIONS

Wee et al., "Secure Scalable Video Streaming for Wireless Networks," IEEE International Conference on Acoustics, Speech, and Signal Processing, Salt Lake City, Utah, May 2001.*

* cited by examiner

*Primary Examiner*—Gilberto Barron, Jr.
*Assistant Examiner*—Devin Almeida

(57) ABSTRACT

A method and apparatus for ensuring the integrity of data. For a plurality of data packets comprising a plurality of first data segments and a plurality of second data segments, a cryptographic checksum is calculated for the plurality of first data segments. The cryptographic checksum is enabled for the plurality of first data segments to be transmitted separately from the plurality of data packets.

34 Claims, 19 Drawing Sheets

METHOD AND APPARATUS FOR ENSURING THE INTEGRITY OF DATA

RELATED U.S. APPLICATIONS

This application is related to and incorporates herein by reference the following commonly-owned co-pending patent applications: patent application U.S. Ser. No. 10/616,680, entitled "CRYPTOGRAPHIC CHECKSUMS ENABLING DATA MANIPULATION AND TRANSCODING," filed Jul. 9, 2003, and assigned to the assignee of the present invention; and patent application U.S. Ser. No. 10/617,348, entitled "METHOD AND SYSTEM FOR PROVIDING TRANSCODABILITY TO FRAME CODED STREAMING MEDIA," filed Jul. 9, 2003, and assigned to the assignee of the present invention.

FIELD OF THE INVENTION

The present invention relates to the field of data manipulation in data transmission and storage. More specifically, the present claimed invention relates to security during the transcoding or processing of data.

BACKGROUND ART

Packetized data transmission and streaming media environments present many challenges for the system designer. For instance, clients can have different display, power, communication, and computational capabilities. In addition, communication links can have different maximum bandwidths, quality levels, and time-varying characteristics. A successful video streaming system, for example, must be able to stream video to different types of clients over time-varying communication links, and this streaming must be performed in a scalable and secure manner. Scalability is needed to enable streaming to a multitude of clients with different device capabilities and security is important, particularly in wireless networks, to protect content from eavesdroppers.

It is noted here that the term "data," as used in this application, can refer to any form of electronic information. "Data" can mean streamed media, such as video or audio, computer information communicated between parts of a network or within a computer's architecture, information computed between computers in a network or via the Internet, whether such information is communicated in wire cables, optical links, wirelessly or by some other means. Data is commonly communicated in a packetized format. The terms "media stream" and "data stream" are used herein to indicate a sequence of data packets being communicated.

It is also noted that, although the ensuing discussion specifically mentions the shortcomings of prior art approaches with respect to the transmission of data, such shortcomings are not limited solely to the communication of any particular type of data. Instead, the problems of the prior art span various types of media data including, but not limited to, audio-based data, speech-based data, image-based data, graphic data, web page-based data, and the like.

In an environment of streamed media data, in order to achieve scalability and efficiency, it is necessary to adapt, or transcode, the compressed media stream at intermediate network nodes. A transcoder takes a compressed media stream as the input, then processes it to produce another compressed media stream as the output. Exemplary transcoding operations include bit rate reduction, rate shaping, spatial down-sampling, frame rate reduction, and changing compression formats. Network transcoding can improve system scalability and efficiency, for example, by adapting the spatial resolution of a video stream for a particular client's display capabilities or by dynamically adjusting the bit rate of a video stream to match a wireless channel's time-varying characteristics.

By way of example, a streaming media video clip may be part of a presentation of a web page. Large and powerful desktop receivers on a large bandwidth connection may receive and decrypt a full resolution, full frame rate, video stream of high-definition television (HDTV) for instance. However, a wireless adjunct to the same network may only be able to connect wireless users at a much smaller bandwidth. The stream must be converted to a smaller bandwidth signal in order to be carried. The conversion is called transcoding.

While network transcoding facilitates scalability in video streaming systems, it also poses a serious threat to the security of the streaming system. This is because conventional transcoding operations performed on encrypted streams generally require decrypting the stream, transcoding the decrypted stream, and then re-encrypting the result. Specifically, the transcoder requires the encryption key and the content is decrypted, and in plain form, at the transcoder. Because every transcoder must decrypt the stream, each network transcoding node presents a possible breach in the security of the entire system.

Furthermore, there may be strategically placed nodes in a network that are ideally located for performing transcoding but cannot be trusted. These untrusted nodes may be individual computers, client intranets at remote locations, or any other node that is interposed between an original sender and an intended receiver.

More specifically, in conventional video streaming approaches, for example, employing application-level encryption, video is first encoded, or compressed, into a bitstream using inter-frame compression algorithms. The resulting bitstream can then be encrypted, and the resulting encrypted stream is packetized and transmitted over the network using a transport protocol such as unreliable datagram protocol (UDP).

It is noted here that, in this discussion of background, the use of the terms "encode, decode, encoding, decoding, encoded, decoded," etc. refer to the compression or other encoding of data into forms suitable for transport over network carriers, whether those carriers are cable, optical fiber, wireless carrier or other network connection. "Encrypt, decrypt, encrypting, decrypting, encryption, decryption," etc. refer to cryptographic encoding that is used to protect the security of data from unauthorized recipients or to verify that the data received is exactly what was originally sent.

FIG. 1A is a block diagram, 100, which illustrates the order in which conventional application-level encryption is performed (i.e. Compression Encoding, 102, Encryption/Checksum Computation, 104 and Packetization, 106). One difficulty with this conventional approach arises when a packet is lost. Specifically, error recovery is difficult because without the data from the lost packet, decryption and/or decoding may be difficult if not impossible.

FIG. 1B illustrates the resultant packetized data stream as produced by process 100 of FIG. 1A. Data stream 111 is compressed by compression encoding function 102, encrypted and cryptographic checksum (CCS) 112 is appended by Encryption/CCS function 104. Packetization, 106, separates the signal, consisting of the data and CCS, into packets of the network's required size, 113. All of the packets must be reassembled into the encrypted data stream in order to decrypt the data, or verify it if it is unencrypted. If one of the packets 113, is lost, then the entire message is lost due to the invalidity of the CCS without the missing packet.

It is noted here that encryption and CCS computation are related but not the same operation. A CCS can be computed, or calculated, and appended to an unencrypted data stream and the CCS can be used to verify the integrity and authenticity of the stream at the receiver. Integrity of data means that the set of data sent is the set of data received and that the receiving device can have a relatively high degree of trust in the received data. Authenticity of data means that the set of data received is actually sent by the purported sender, e.g., that no hostile alias has been used. Again, the term relates to the degree of trust the receiver can have in the received data.

FIG. 1C illustrates a functional block diagram of a transcoding process in which encrypted data must be transcoded for reasons discussed previously. In process 120, the media stream is decrypted at 122, transcoded at 124, then re-encrypted at 126. During the period in which the data is unencrypted, it is accessible to unauthorized reading or manipulation at an insecure or untrusted node.

In hybrid wired/wireless networks, it is often necessary to simultaneously stream media to fixed clients on a wired network and to mobile clients on a wireless network. In such a hybrid system, it may often be desirable to send a full-bandwidth, high-resolution data stream to the fixed, wired, client, and a lower-bandwidth, medium-resolution media stream to the mobile wireless receiver. Conventional media streaming approaches, however, do not achieve the efficiency, security, and scalability necessary to readily accommodate the streaming corresponding to hybrid wired/wireless networks.

Furthermore, the growing sophistication and hostility of unwanted senders and transcoders of data, and the ever-increasing need for speed of data communication in the complex data environment work against each other. Increased need for speed drives the transmission of data to be simpler, ideally without any cryptographic checksums, while heightened security needs require more complex cryptographic checksums, calculated more often.

What is needed, then, is a method and/or system that can enable a potentially untrusted transcoder in the middle of a network to transcode a stream of packetized data while still preserving the end-to-end security of the rest of the stream. Such a method and system should also provide communication integrity checking without undue drain on the speed of communication. Specifically, what is needed is a means for computing and performing the cryptographic checksum that allows a potentially untrusted transcoder to perform the transcoding in an appropriate manner, yet still allowing the intended receiver to validate the integrity of the transmitted data and allowing any encryption of the transmitted data to remain uncompromised and trusted to as high a degree as possible.

SUMMARY OF THE INVENTION

Accordingly, presented herein is a method and system for calculating cryptographic checksums across data packets, enabling a potentially untrusted transcoder in the middle of a network to transcode a stream of packetized data while still preserving the end-to-end integrity and security of the rest of the stream. The presented method and system provides communication integrity checking without undue drain on the speed of communication calculating cryptographic checksums across packet boundaries, thus enabling a very efficient and adaptive cryptographic checksum calculation. The cryptographic checksum calculated across packets allows a potentially untrusted transcoder to perform transcoding in an appropriate manner, yet still allows the intended receiver to validate the integrity of the transmitted data and allows any encryption of the transmitted data to remain uncompromised and trusted to as high a degree as possible.

Disclosed are a method and apparatus for ensuring the integrity of data. In one embodiment, the present invention, for a plurality of data packets comprising a plurality of first data segments and a plurality of second data segments, calculates a cryptographic checksum for the plurality of first data segments and enables the cryptographic checksum for the plurality of first data segments to be transmitted separately from the plurality of data packets.

BRIEF DESCRIPTION OF THE DRAWINGS

The operation of this invention can be best visualized by reference to the drawings.

DETAILED DESCRIPTION

This application is related to and incorporates herein by reference the following commonly-owned co-pending patent applications: patent application U.S. Ser. No. 10/616,680, entitled "CRYPTOGRAPHIC CHECKSUMS ENABLING DATA MANIPULATION AND TRANSCODING," filed Jul. 9, 2003, and assigned to the assignee of the present invention; and patent application U.S. Ser. No. 10/617,348, entitled "METHOD AND SYSTEM FOR PROVIDING TRANSCODABILITY TO FRAME CODED STREAMING MEDIA," filed Jul. 9, 2003, and assigned to the assignee of the present invention.

The following descriptions of specific embodiments of the present invention are presented for purposes of illustration and description. They are not intended to be exhaustive or to limit the invention to the precise forms disclosed, and obviously many modifications and variations are possible in light of the following teaching. The embodiments are chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

Presented herein is a method to create and apply a cryptographic checksum for packetized data. The goal of the cryptographic checksum (CCS) is to validate the integrity of the data, for example to verify that it has not been altered by others. In one embodiment, the presentation of the present invention is in the context of secure scalable streaming (SSS) to enable a potentially untrusted transcoder to transcode a media stream while still preserving the desired end-to-end security of the media stream. Specifically, disclosed herein is a method and system for designing and performing the cryptographic checksum across a plurality of data packets such that, as long as the potentially untrusted transcoder performs the transcoding in the appropriate manner, the receiver is still able to validate the integrity of the sent data.

Secure transcoding is necessary because a potentially untrusted transcoder cannot be counted on to add a proper cryptographic checksum after its transcoding. Instead, embodiments of the present invention are designed so that the sender has already included the checksum for possible transcoded bitstreams.

Figure 1A:
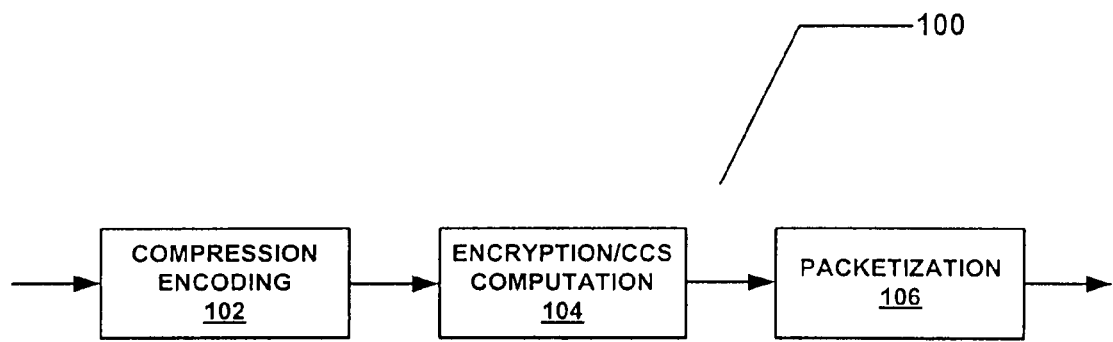
FIG. 1A is a block diagram which illustrates the order in which conventional application-level encryption is performed.
Figure 1B:
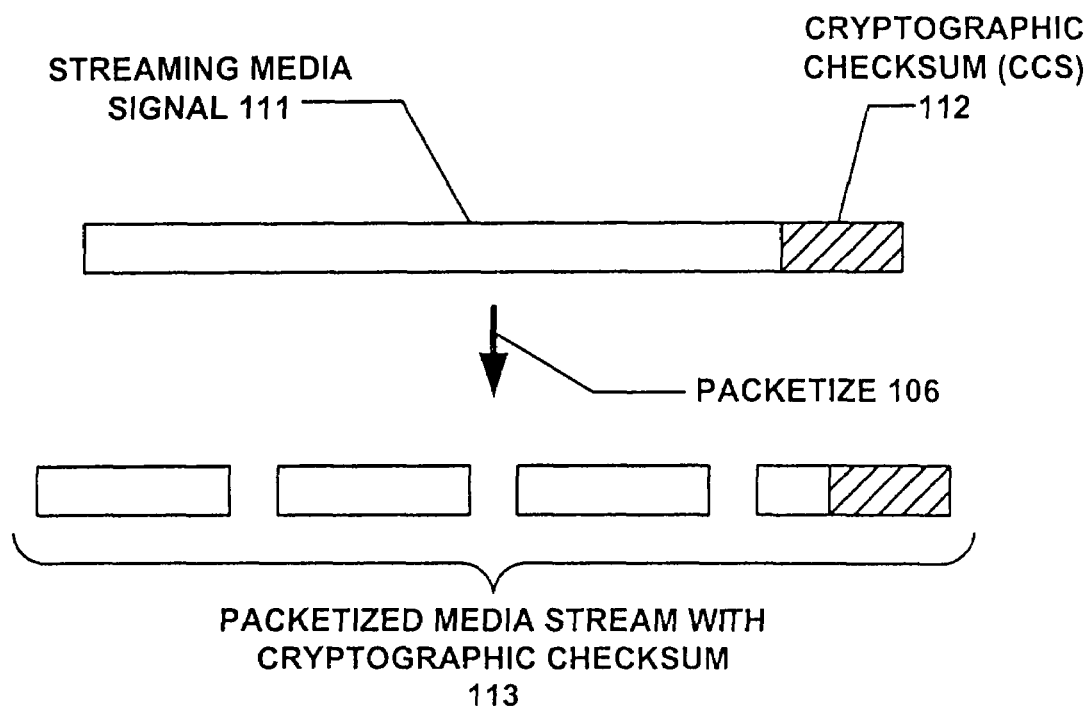
FIG. 1B is a block diagram which illustrates the transmitted result of conventional application-level encryption.
Figure 1C:
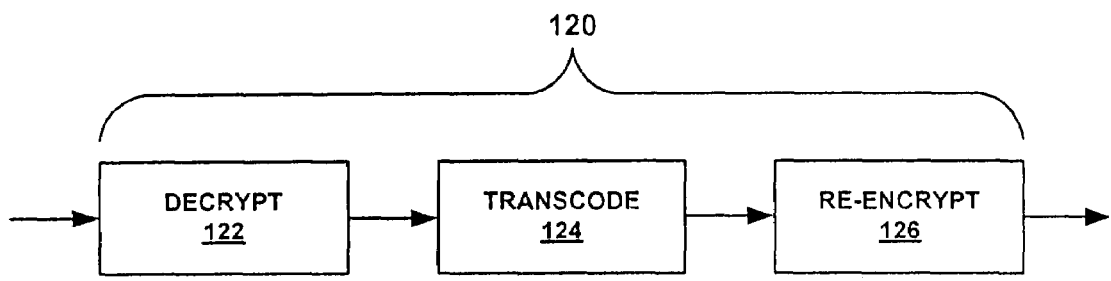
FIG. 1C is a block diagram which illustrates another conventional secure streaming system using network-level encryption.
Figure 2:
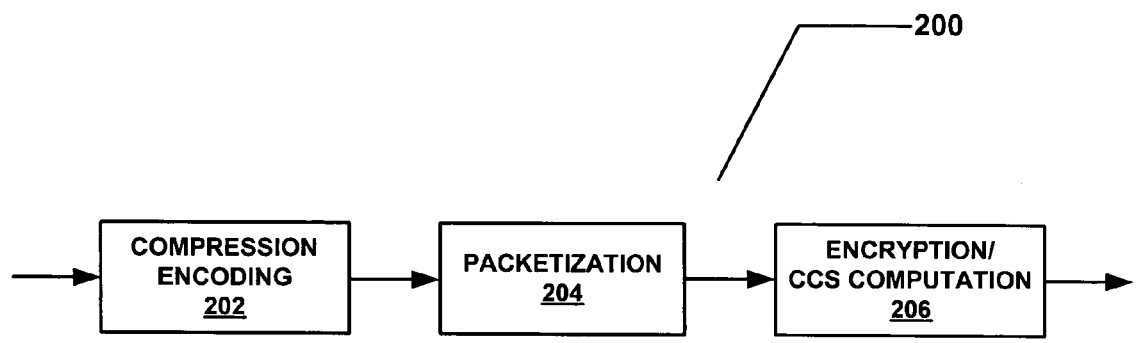
FIG. 2 is a block diagram which illustrates a packetization and encryption method in accordance with embodiments of the present invention.

FIG. 2 illustrates one embodiment of the present invention. FIG. 2 is a block diagram 200 illustrating a method of achieving a secure media streaming system that offers a means of overcoming the aforementioned shortcomings. Process 200 incorporates compression/encoding function 202, packetization 204, and encryption/CCS computation 206. In this process, packetization for transmission takes place before encryption/CCS computation 206. The method of FIG. 2 can use any of the conventional compression algorithms. Here, the data stream is encoded before checksum computation 206 computes a cryptographic checksum for each data packet.

Figure 3:
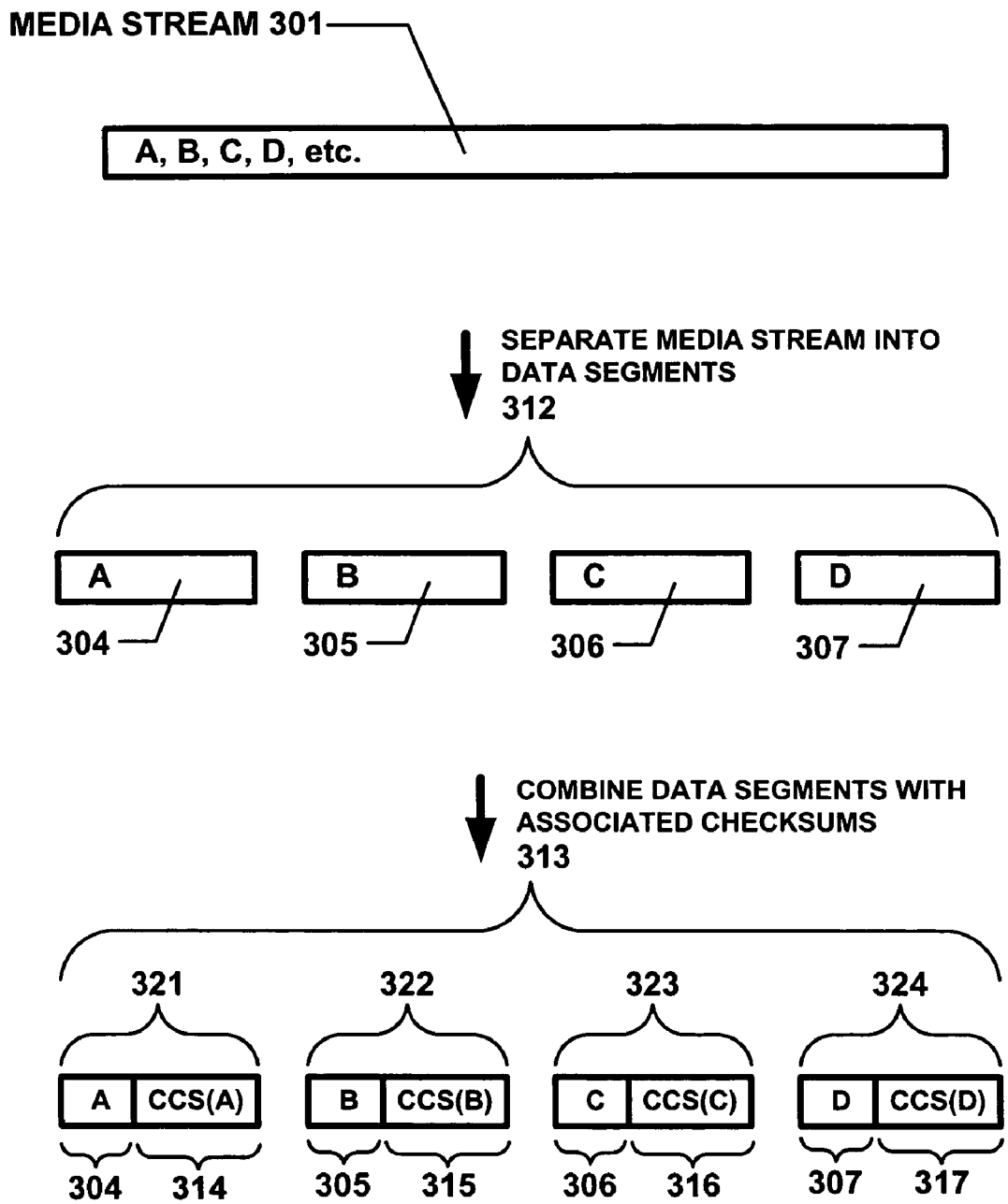
FIG. 3 illustrates the encoded, packetized and encrypted media stream in accordance with embodiments of the present invention.

FIG. 3 illustrates a result of an embodiment of process 200 where data 301 is separated, at 312, into segments A, 304; B, 305; C, 306 and D, 307. A cryptographic checksum is computed for each segment 304-307. At 313, after cryptographic checksum computation, each segment 304-307 and its respective cryptographic checksum 314, 315, 316 and 317 is combined into a data packet 321, 322, 323 and 324. For example, segment A, 304, and its associated checksum, CCS (A), 314, are combined to form data packet 321. Segment B, 305, and its associated checksum, CCS(B), 315, are combined to form data packet 322.

It is noted here that the length of each data segment, in embodiments of the present invention, is chosen so that its maximum length plus that of its associated CCS is less than the maximum packet payload size or the maximum transmittable unit (MTU) for the network. As discussed earlier, a data packet may ultimately comprise a single segment or a plurality of segments. It is noted also that, though there are four packets illustrated, any number of packets can be used.

It is noted here that the terms "segment," "independently decodable part" and "truncatable unit" can have different meanings in the embodiments of the present invention discussed here. An independently decodable part of a packet is a portion of the packet's payload that can be decoded without the necessity of decoding other portions of the packet payload. Further, if encrypted, the independently decodable part can be decrypted without decryption of the remainder of the payload. A truncatable unit is a portion of a packet payload that can be truncated from the packet, with or without decryption, without detrimental effect on the remainder of the packet. At times in this discussion, the terms are used somewhat interchangeably but still maintain their separate meanings. A segment is a portion of data that can comprise the entirety of a packet payload or some portion thereof. A segment can be an independently decodable part or a truncatable unit or both or neither, depending on the usage of the term.

In one embodiment, the term "segment" is used to imply a decodable frame of streaming video. In another embodiment, "segment" is used to denote portions of a data packet that have individually calculated cryptographic checksums. In still another embodiment, the term is used to denote grouped-together portions of a plurality of packets, in which cryptographic checksums are calculated for the entire plurality of segments.

Figure 4A:
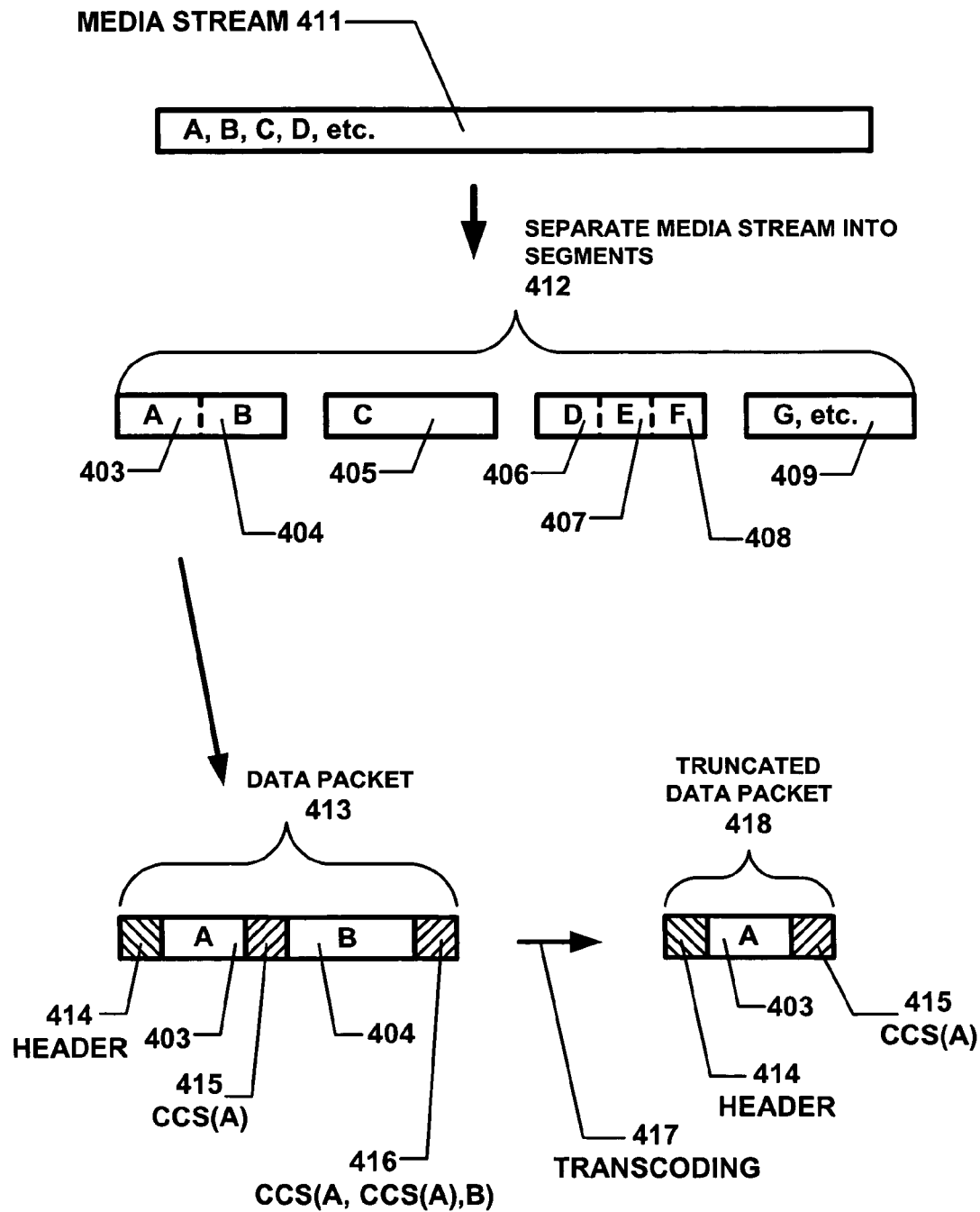
FIG. 4A illustrates an encoded digital stream with independently computed cryptographic checksums in accordance with embodiments of the present invention.

FIG. 4A illustrates the functionality of an embodiment of the present invention in which transcoding can occur by truncation. Media stream 411 is separated, at 412, into segments, each comprising one or more independently decodable parts (A, B, etc). It is noted again that a packet payload can comprise one or more independently decodable parts or segments and, in some embodiments, the independently decodable parts can comprise independently truncatable units. As shown at packet 413, a cryptographic checksum is computed for each of the decodable parts or truncatable units, in order of priority. Cryptographic checksum 415 is computed for the first truncatable unit A, 403, resulting in CCS(A) 415. Cryptographic checksum 416 is computed for the entire preceding packet payload which comprises independently decodable part A, 403, cryptographic checksum CCS(A), 415, and independently decodable part B, 404. The resulting checksum is shown as CCS(A,CCS(A),B), 416. It is noted that, if a third independently decodable part were included, the next cryptographic checksum would be designated as:

CCS(A,CCS(A),B,CCS(A,CCS(A),B),C).

A transcoder-readable header, 414, is applied to the packet 413. The transcoder readable header contains information such as the truncation points in the packet.

When transcoding, 417, occurs in this embodiment, the transcoder can truncate selected truncatable units. If the packet is encrypted, decryption is not required in order to accomplish this form of transcoding. In the example illustrated in FIG. 4A, truncatable unit B and its associated cryptographic checksum, 416, are truncated. The untruncated, and undecrypted, remainder of the packet, 418, is then forwarded with its necessary cryptographic checksum, CCS(A) 415, independently decodable part A 403, and header 414, intact. In the embodiment of the present invention illustrated in FIG. 4A, any number of truncatable units and their associated cryptographic checksum can be truncated from a packet as necessary for transcoding requirements. In each case, the truncatable unit, its associated cryptographic checksum and subsequent truncatable units whose cryptographic checksums include calculation for the truncated units are also truncated.

Figure 4B:
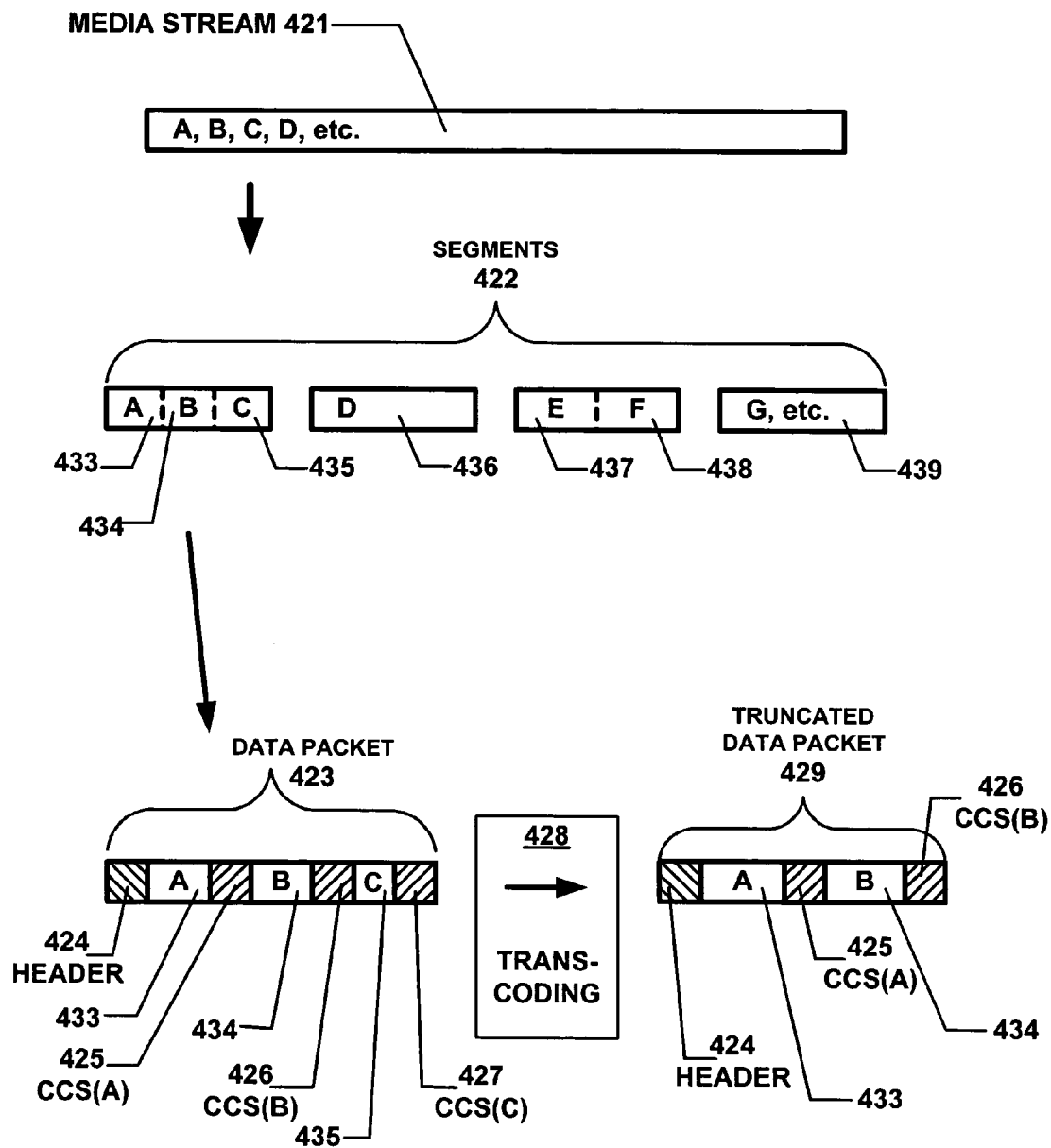
FIG. 4B illustrates an encoded digital stream with independently computed cryptographic checksums in accordance with embodiments of the present invention.

FIG. 4B illustrates another embodiment of the present invention. Here, media stream 421 is separated at 422 into segments which, as discussed above, may comprise any number of independently decodable parts, shown as A, B, C, D, etc. It is noted that, in this example, some segments comprise more independently decodable parts than others because of the size of each part. The selection of the number of independently decodable parts is, in this embodiment of the present invention, predicated on the maximum size of the data packet. For example independently decodable parts A, 433, B, 434, and C, 435, are combined in one segment while independently decodable part D, 436, occupies a similarly-sized segment by itself.

In the embodiment illustrated in FIG. 4B, a cryptographic checksum is calculated for each independently decodable part, independently of other independently decodable parts. Data packet 423 is formed of the combination of independently decodable part A, 433, and CCS(A), 425, independently decodable part B, 434, and CCS(B), 426, and independently decodable part C, 435, and CCS(C), 427.

Transcoding, 428, of packet 423 then involves truncating the selected independently decodable parts, or truncatable units, and associated cryptographic checksums. In the example shown, truncatable unit C, 435, and CCS(C), 427, are truncated. In this embodiment, transcoder-readable header 424 remains intact and retains its information regarding truncation points. Truncated packet 429, therefore, is available to be transcoded by truncation subsequently by truncating truncatable unit B and CCS(B), 426. In this fashion, transcoding can occur at any desired point in a network without any packet having to be decrypted and re-encrypted to achieve the transcoding. At each truncation, the remainder of the packet, undecrypted, retains its necessary cryptographic checksums and the streamed media retains its end-to-end security.

It is noted here that, in some embodiments, transcoding can occur by deleting entire packets from the media stream. It is also noted that cryptographic checksums can also be used in unencrypted media streams, such as for packet verification.

Figure 5A:
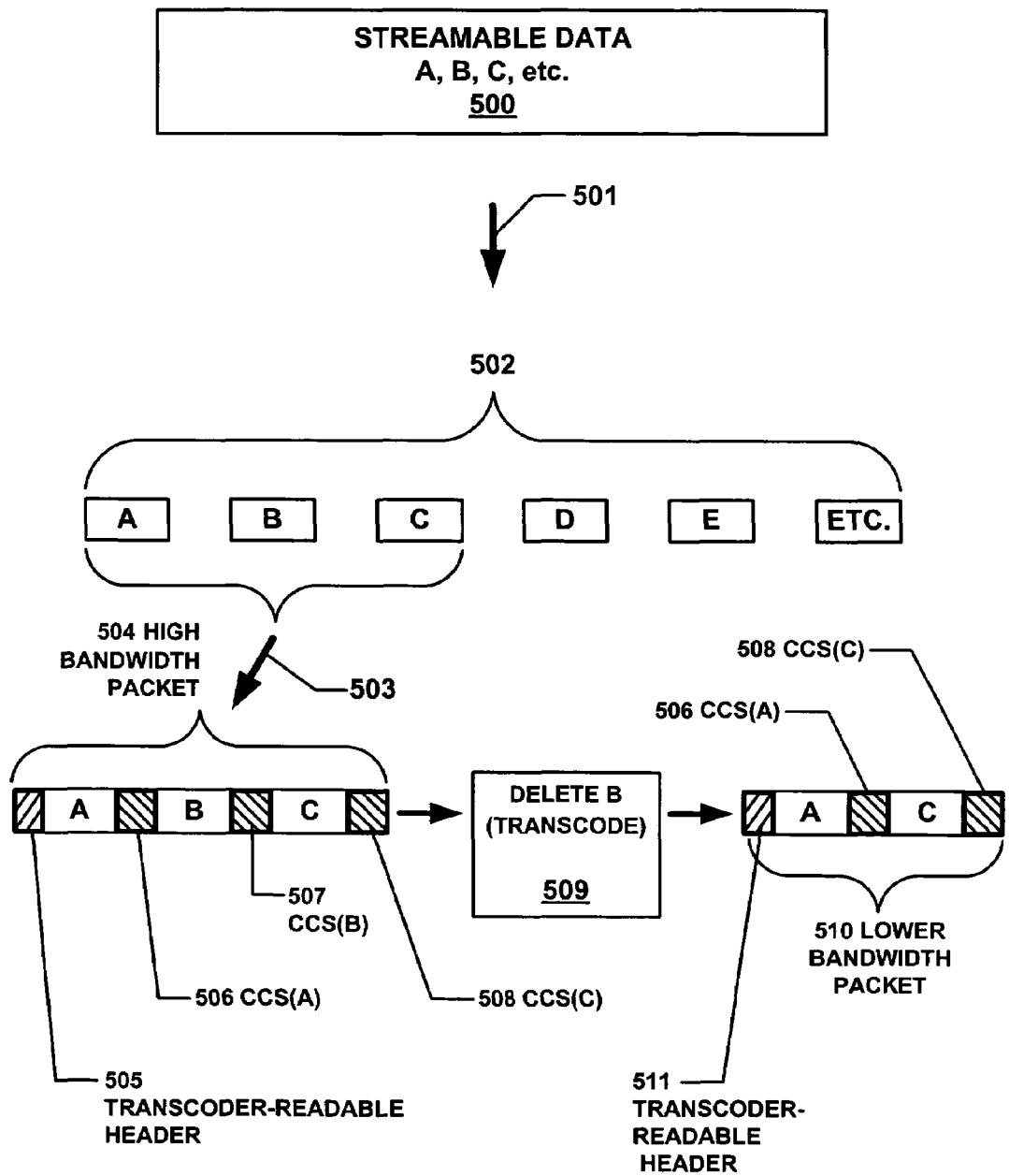
FIG. 5A illustrates an encoded data stream with independently computed cryptographic checksums appended in accordance with embodiments of the present invention.

FIG. 5A illustrates a result of the processes incurred by the embodiments of the present invention. Media stream 500, comprising data illustrated as "A, B, C, etc." is separated, 501, into truncatable units, 502. Each packet payload, in a secure media stream, is encrypted, 503, and appended with an independent cryptographic checksum (CCS), illustrated as CCS (A), 506, CCS(B), 507, and CCS(C), 508. The encrypted truncatable units, with the associated cryptographic checksums, are combined into appropriate length transmittable data packets, as shown at 504.

It is noted here that cryptographic checksums may be calculated by way of many different functions. A common checksum can involve a well-known hash function, which provides a fingerprint of the data contained in an encrypted data packet and can guarantee the authenticity of received data and the validity of decrypted data. Other examples of checksum functions that can be used to provide cryptographic checksum capability include Message Authentication Codes (MAC), keyed hashes such as MD4 & MD5 (Message Digest algorithms), SHA (Secure Hash Algorithm), RIPEMD (RACE Integrity Primitives Evaluation Message Digest), and HMAC (keyed-Hashing for Message Authentication). Also, in some implementations, digital signature schemes may also be used.

In another embodiment of the present invention, the separation of data segments into truncatable units is referred to as secure scalable streaming (SSS). Using techniques such as SSS, the truncatable units are packetized. Each data packet can be transcoded by truncating the packet at appropriate truncation points which may be defined in a header included in the packet. For example, during transcoding, bit rate reduction, frame rate reduction, or the like is achieved by truncating, or eliminating, one or more truncatable units from the packet.

In this embodiment of the present invention, a transcoder-readable header, 505, is written and applied to the transmittable packet. As discussed in reference to FIG. 5A, above, the transcoder-readable header comprises information relating to the packet payloads within the packet but does not disclose the contents of the packet payloads. By reading the transcoder-readable header, the transcoder can delete portions, 509, or "scale down" a transmittable packet without decrypting either the deleted part or the remainder of the packet, as illustrated at 510. In the example shown, independently decodable part B with its associated cryptographic checksum, is deleted with no effect on independently decodable parts A or C or their associated cryptographic checksums. In this fashion, end-to-end security of the streamed media data is maintained without hindering the transcoding function, and the receiver can validate the integrity of the transcoded data.

Figure 5B:
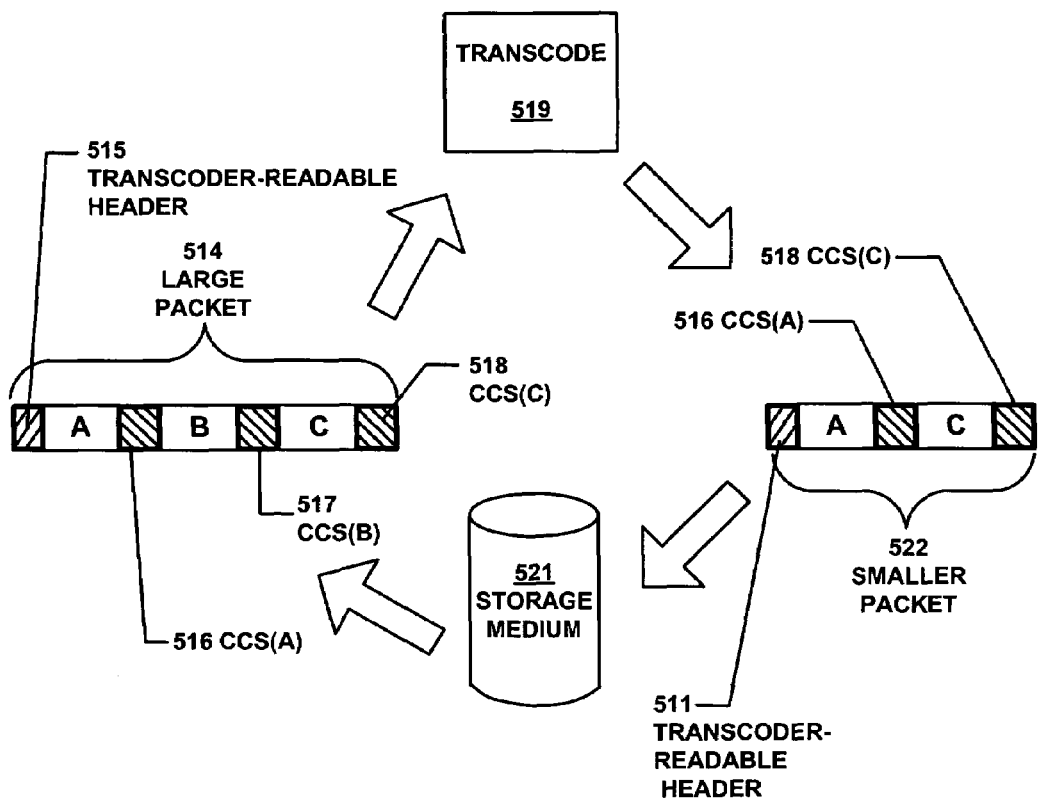
FIG. 5B illustrates encoded digital data packets with independently computed cryptographic checksums appended in accordance with embodiments of the present invention being transcoded and stored.

In the embodiments illustrated in FIGS. 5A and 5B, after transcoding occurs, a new transcoder-readable header, 511, may be written to reflect the content of the new data packet, 510. As in the previous transcoder-readable header, information about the start and end points of the included packet payloads and the payload priority is included but information disclosing the contents is not. Indeed, because the new transcoder-readable header is written by a transcoder which does not have the key with which to decrypt the packet payloads or to evaluate the CCSs, the new transcoder-readable header is not capable of disclosing packet payload contents.

With a new transcoder-readable header, possible further transcoding and scaling is able to take place at another location downstream in the communication. In addition to packet payload size and location, packet payload priority is included in the transcoder-readable header and other priority information can be included, such as information from a web page that is considered discardable by web page owner. In the case of transmission to a handheld device with a lower display capability than a large desktop computer, much of the information in some complex web pages is lost even if it is attempted to be displayed. By making this lower priority information removable in early transcoding, valuable bandwidth can be preserved for other uses when transmitting to these smaller devices.

Embodiments of the present invention are enabled to process data packets that are not streamed. FIG. 5B illustrates, in block format, the process of another embodiment. Here, stored data is manipulated without disturbing the cryptographic checksums. Large data packet 514, comprising segments A, B, & C, is taken from storage medium 521. In the example of FIG. 5B, data is in essence compressed to reduce storage space. This is accomplished by the removal of a segment of data, in this case segment B, and its associated CCS, 517, by transcoding, 519. The result of transcoding is the smaller data packet 522. It is noted that transcoding in this manner leaves segments A and C intact and, significantly, CCS(A) 516 and CCS(C) 518, are undisturbed. If necessary to later operations, transcoder-readable header 515 can be replaced by new transcoder readable header 511.

It is noted that the transcoding schemes provided by embodiments of the present invention are not limited to streamed data but can also be used in stored data. Additionally, the transcoding techniques are useful for unencrypted data as well as encrypted data. In either case, transcoding can occur without disruption of the cryptographic checksums and without having to read the encoded data.

Figure 6A:
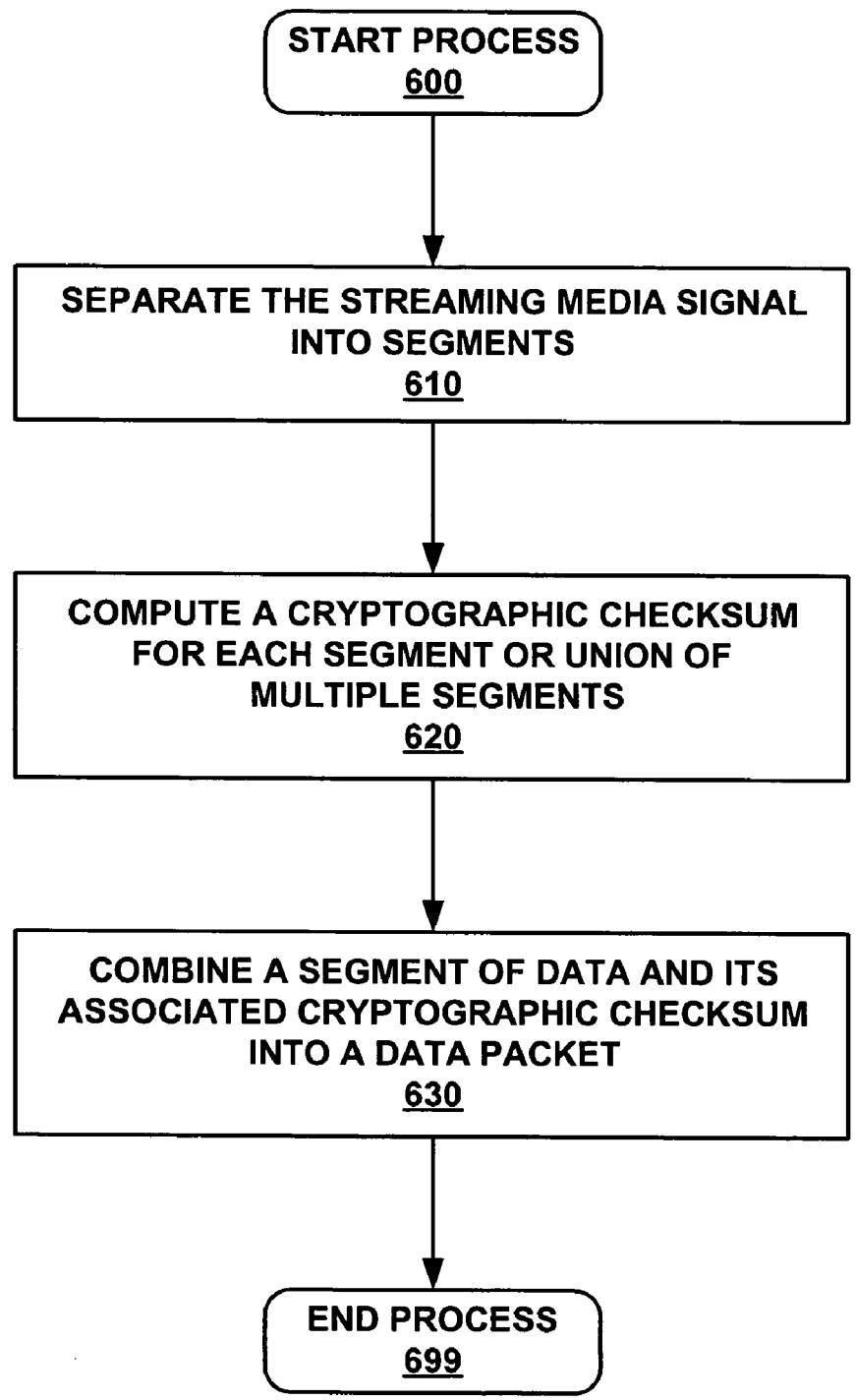
FIG. 6A is a block diagram illustrating a method in accordance with embodiments of the present invention.

One embodiment of a process by which this is accomplished is illustrated in FIG. 6A. Process 600 begins by separating the media signal to be streamed into segments at 610. The segments may be any appropriate division that allows one or more of the segments and their associated cryptographic checksums, to fit into a communication packet. An example of appropriately separated independently decodable parts can be parts of highly detailed compressed images, such as can be transmitted with the compression standard developed by the Joint Picture Expert Group (JPEG), for example JPEG-2000. In many instances, the first data transmitted contains data sufficient to produce a highly pixilated image. Subsequent data in the stream then successively refines the image detail. The presentation of such an image on a large display can make use of the enhanced detail. However, the display on a handheld computer may show no difference between the image after the first refinement and after the last and most highly detailed refinement. A logical transcode can remove the more highly detailed data from the stream if the receiver is unable to use the detail. In some instances of transmitted data, a single packet may contain data comprising several levels of detail. However, some larger images may have many packets required to carry all the requisite data.

Once separated, a cryptographic checksum is computed for each segment, or union of multiple segments, at 620. At 630, the segments and their associated cryptographic checksums are combined into appropriately sized data packets for transmission in the network.

Figure 6B:
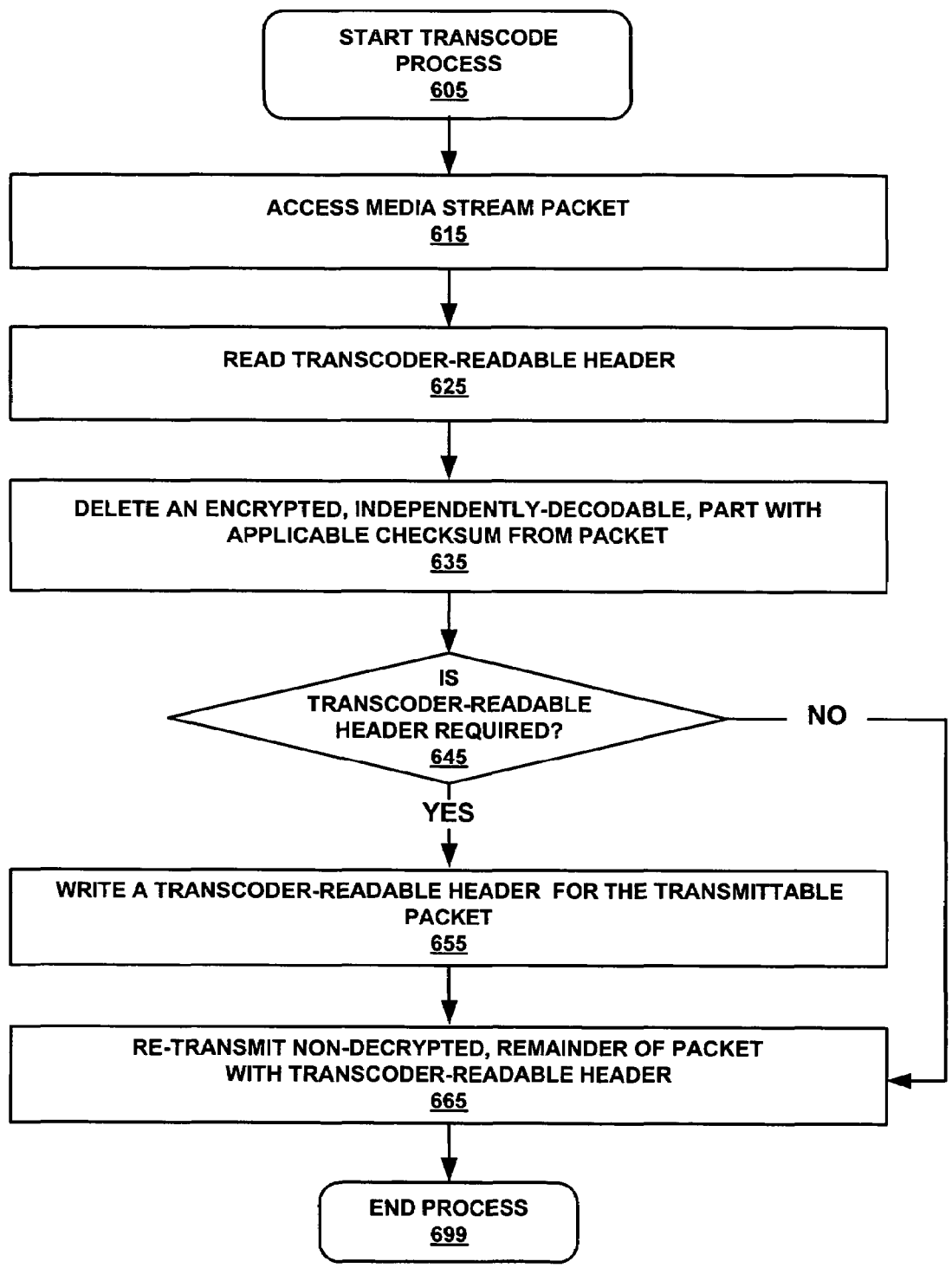
FIG. 6B is a block diagram illustrating a transcoding method in accordance with embodiments of the present invention.

FIG. 6B illustrates the ensuing action by a transcoder in this embodiment. When a transcoder, operating at a potentially untrusted node, is required for transcoding the media stream, whether to reduce required bandwidth or to accommodate the limitations of an intended receiver or for any other reason, the media stream is accessed at 615 and the transcoder-readable header is read at 625. The transcoder-readable header contains information salient to the contents of the of the packet, such as truncation points, start and end points of each independently decodable part, the relative importance of the part, etc. that can be used in determining whether to delete a given part of the packet. Deleting appropriate independently decodable parts of a packet is accomplished at 635. It is noted that deleting a part of a packet without affecting the encryption, coding or integrity of the remainder of the packet produces a smaller packet, more amenable to communication in a broadband-limited environment. If a transcoder readable header is required, 645, it is written at 655 and applied to the truncated data packet. Forwarding of the packet occurs at 665.

It is noted here that embodiments of the present invention perform the same functions in the encoding and transmission of unencrypted data. The data verification functions of the cryptographic checksums remain similar whether the underlying data is encrypted or clear. Furthermore, the data verification functions of the cryptographic checksums remain similar for applications where a portion of the data is unencrypted and a portion is encrypted.

As will be discussed further, one advantage to the form of cryptographic checksum calculation employed in embodiments of the present invention is that it results in a more compact untranscoded data stream. With smaller data streams and fewer cryptographic checksums to calculate, data communication can be faster than with previous forms of cryptographic checksum calculation.

Figure 7A:
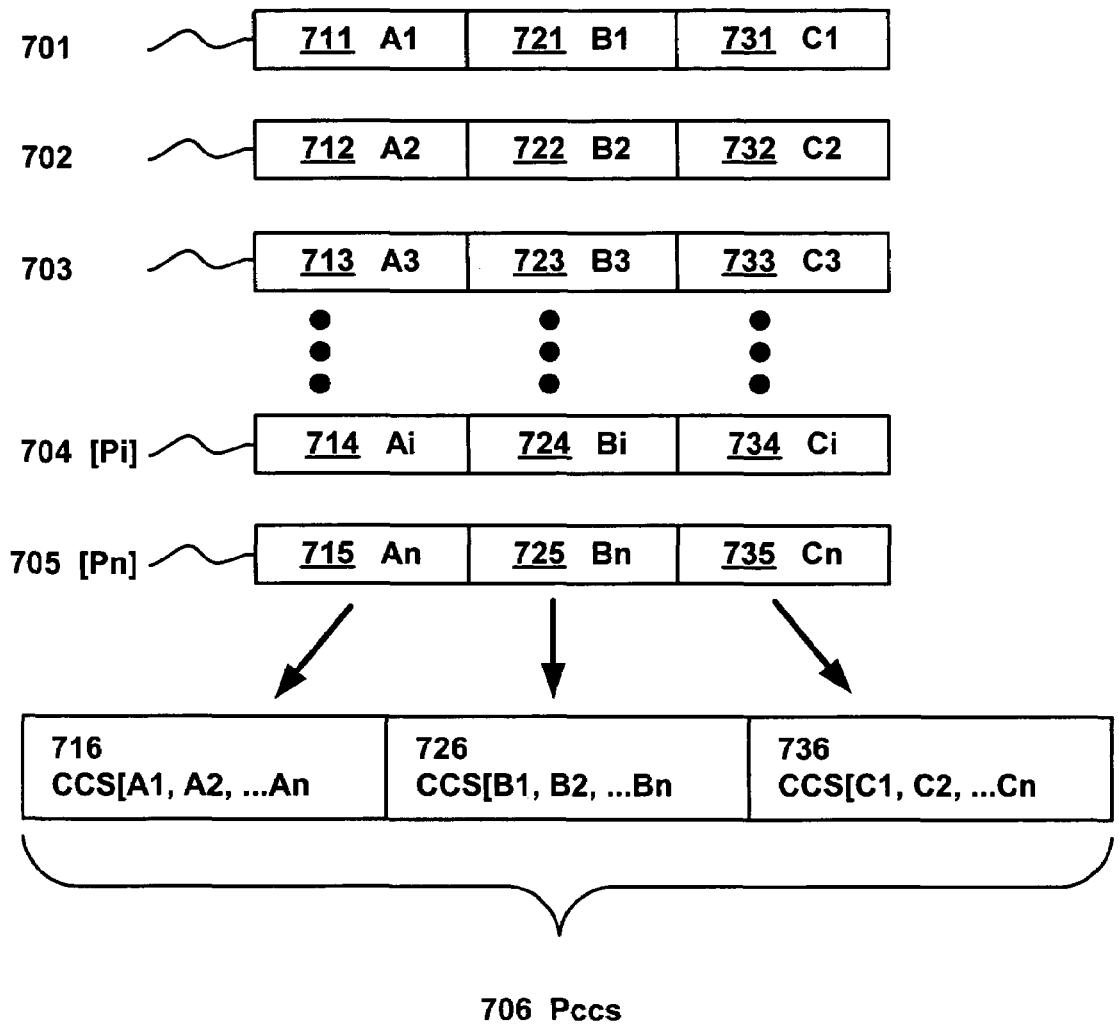
FIG. 7A illustrates the segmentation of data within packets and the calculation of cryptographic checksums across packets in accordance with embodiments of the present invention.

FIG. 7A illustrates the segmentation of data within packets and the calculation of cryptographic checksums across packets. Here, packets P1, P2, P3, through Pi and Pn, denoted as 701-705 respectively, each by way of example contain three segments A1, B1, C1 through An, Bn, Cn. The segments are denoted as: 711, 721, 731; 712, 722, 732; 713, 723, 733; 714, 724, 734, and 715, 725, 735, respectively. In this embodiment of the present invention, a cryptographic checksum is calculated for selected segments from different packets.

In one embodiment, a cryptographic checksum 716 is calculated for all of the "A" segments in P1-Pn. This cryptographic checksum is called, here, CCS[A1, A2, . . . An]. Similarly, a cryptographic checksum 726 is calculated for all of the "B" segments in P1-Pn. This cryptographic checksum is called, here, CCS[B1, B2, . . . Bn]. Similarly, cryptographic checksum 736 is calculated for all of the "C" segments in P1-Pn. This cryptographic checksum is called, here, CCS[C1, C2, . . . Cn]. In this embodiment, the three illustrated cryptographic checksums are concatenated into an additional packet 706, called here Pccs.

It is noted here that, though three segments are shown in all of the illustrated packets, packets can have any number of segments. Packets having differing numbers of segments may also be accommodated by embodiments of the present invention. Furthermore, packets having differing numbers of data segments can comprise a single data stream.

In addition, even though the segments shown in the illustration are of uniform size, generally the segments will be of different sizes and this is straightforwardly accommodated by embodiments of the present invention.

It is noted, too, that the calculated cryptographic checksums for groups of segments may themselves be transmitted in different packets, or the same packet. Embodiments of the present invention are enabled to append, concatenate or assemble any combination of segments in packets.

Embodiments of the present invention accommodate packets of differing numbers of segments because, for example, segments are rarely of a uniform size and therefore a variable number of segments may fit into a packet depending on the size of the segments and the size of the packets. As an example, an MPEG-encoded video sequence may have three different types of frames, which can be segments. Furthermore, the content of the video itself can cause the frames to vary widely in size. Multiple segments and varying numbers of segments within a given packet are accommodated by the present embodiments in order to efficiently use available communication bandwidth.

Figure 7B:
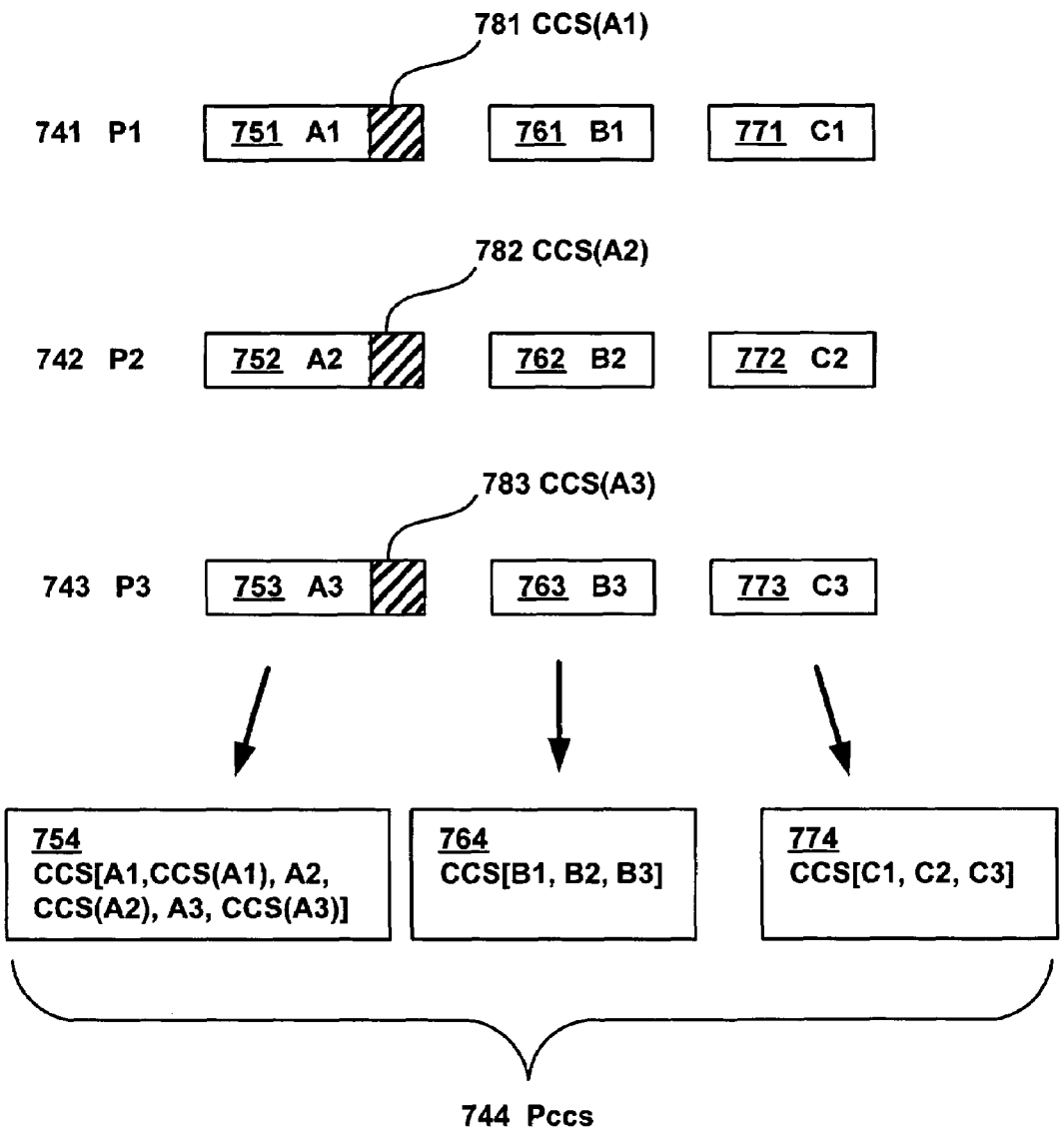
FIG. 7B illustrates the segmentation of data within packets and the calculation of cryptographic checksums both across and within packets in accordance with embodiments of the present invention.

FIG. 7B illustrates the segmentation of data within packets and the calculation of cryptographic checksums both across and within packets. Here, three packets P1, P2 and P3 each, again, have three segments A, B, and C, denoted: 751, 761, 771; 752, 762, 772: and 753, 763, 773, respectively. Here, unlike the segments discussed above, the three A segments, 751, 752, 753 each have their own cryptographic checksums appended to the segment and contained within the segment's associated packet. These internal cryptographic checksums are denoted CCS(A1), 781, CCS(A2), 782, and CCS(A3), 783. As before, a set of cryptographic checksums are calculated for the groups of segments and concatenated in an additional packet. However, the cryptographic checksum for the "A" segments, 754, comprises a cryptographic checksum for the segments as well as their associated appended cryptographic checksums. This cryptographic checksum 754 is denoted CCS[A1,CCS(A1),A2,CCS(A2),A3,CCS(A3)]. The remaining cryptographic checksums in Pccs 744 are cryptographic checksums for the segments alone. E.g., segment 764 of Pccs 744 comprises a cryptographic checksum for the three B segments, CCS(B1, B2, B3). Segment 774 comprises a cryptographic checksum for the three C segments, CCS(C1, C2, C3). Neither segment, 764 and 774, comprise a cryptographic checksum for a segment comprising another checksum as does segment 754, in the example of FIG. 7B.

It is noted that embodiments of the present invention are enabled to combine any combination of segment cryptographic checksum and segment/CCS cryptographic checksum. It is also noted that an appended cryptographic checksum need not be for the first segment in a packet but can be included for any segment for which it is needed.

It is noted that embodiments of the present invention are enabled to calculate different cryptographic checksums for different segments within a data packet. Embodiments can also calculate cryptographic checksums for one segment without calculating a cryptographic checksum for another segment in the same packet. This enables cryptographic checksums to be calculated at differing rates within a data stream. Thus some embodiments of the present invention are able to adapt cryptographic checksum calculation to available bandwidth or to varying security needs, or to varying available computational capability, or to other criteria. As is discussed further below, integrity checking can take priority over transcoding enablement and vice versa. The needs of transcoding may be higher than those of integrity checking, for example, and can require more or less frequent cryptographic checksum calculation for data segments having a lower integrity priority than for those with a higher integrity priority.

It is noted here that the packets illustrated and discussed above can be sent in the same data path as the data packets of interest. However they are not limited to the same data path. In an environment of high security concern, for example, cryptographic checksum packets may be sent out-of-band, meaning via a different data path. In some networks, for example, there can be a separate high-security administrator's net that is subject to much higher security than the network in general. Cryptographic checksums that are used to ensure the security and integrity of data can be sent on these parallel paths to the same receiving node that receives the data packets or to some other node.

Figure 8:
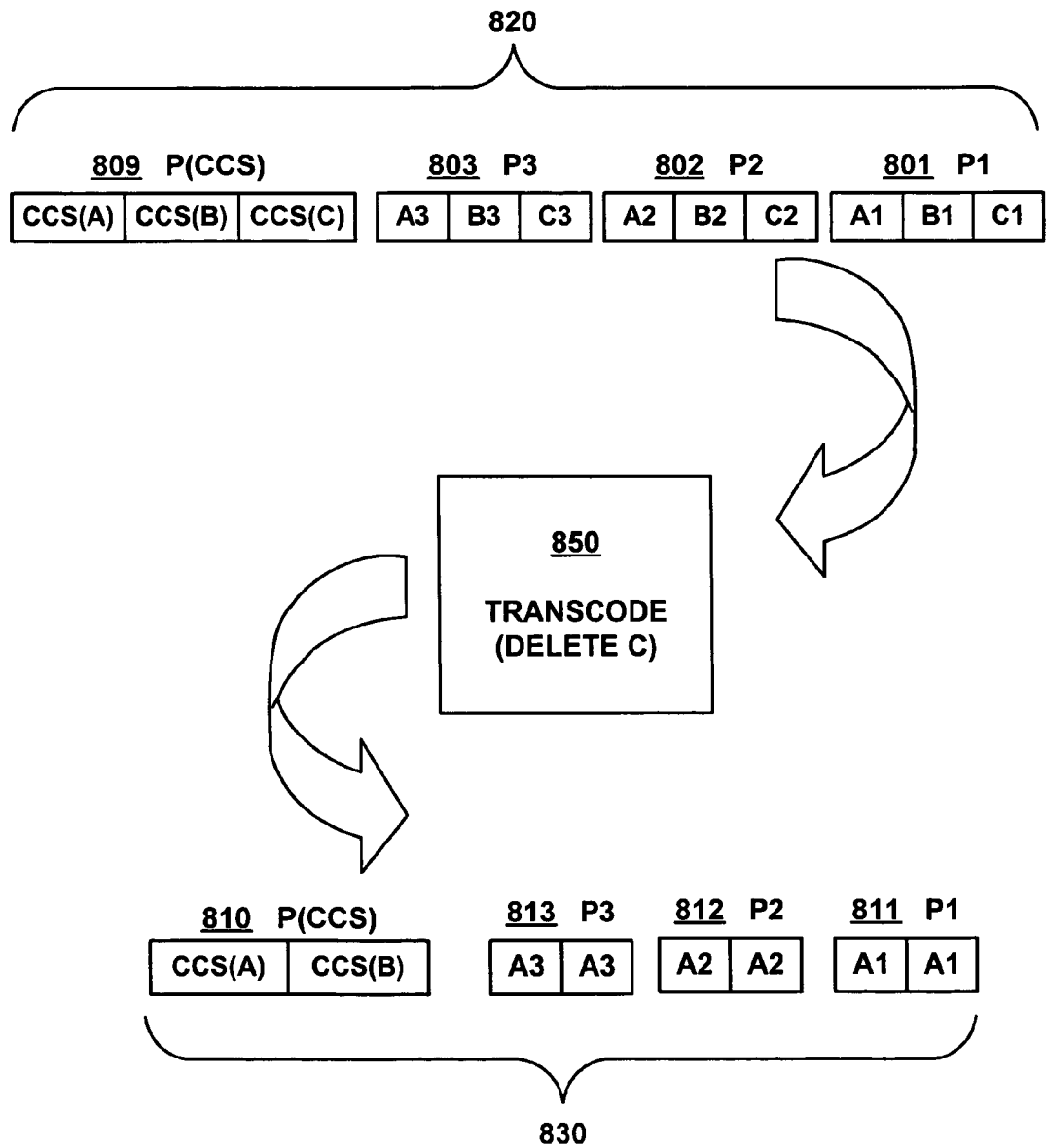
FIG. 8 illustrates transcoding of a data packet stream by segment truncation in accordance with an embodiment of the present invention.

FIG. 8 illustrates a transcoding of a data stream by a potentially untrusted transcoding node. Here, exemplary data stream 820 comprises four data packets, of which three, 801, 802 and 803, comprise three segments each, A, B and C. The fourth packet 809 comprises cryptographic checksums for the data segments, CCS(A), CCS(B) and CCS(C). Transcoding, which can be accomplished for a number of purposes and by a number of means, is accomplished here by the deletion of the C segments from each of the data packets at 850. The transcoder, which only needs to know truncation points in each packet, truncates the C segment from each data packet and also truncates the CCS(C) from the Pccs, 809. The truncation points can be identified in a packet header. The resultant data packet stream 830 now comprises a set of smaller packets 811-813 as well as a smaller Pccs 810. This truncating transcode can be accomplished equally well on encrypted and unencrypted data streams, or data streams where a portion of the data is encrypted and a portion is not encrypted.

As noted above, one advantage to this form of cryptographic checksum calculation results in a more compact untranscoded data stream. With smaller data streams and fewer cryptographic checksums to calculate, data communication can be faster than with previous forms of cryptographic checksum calculation.

Figure 9:
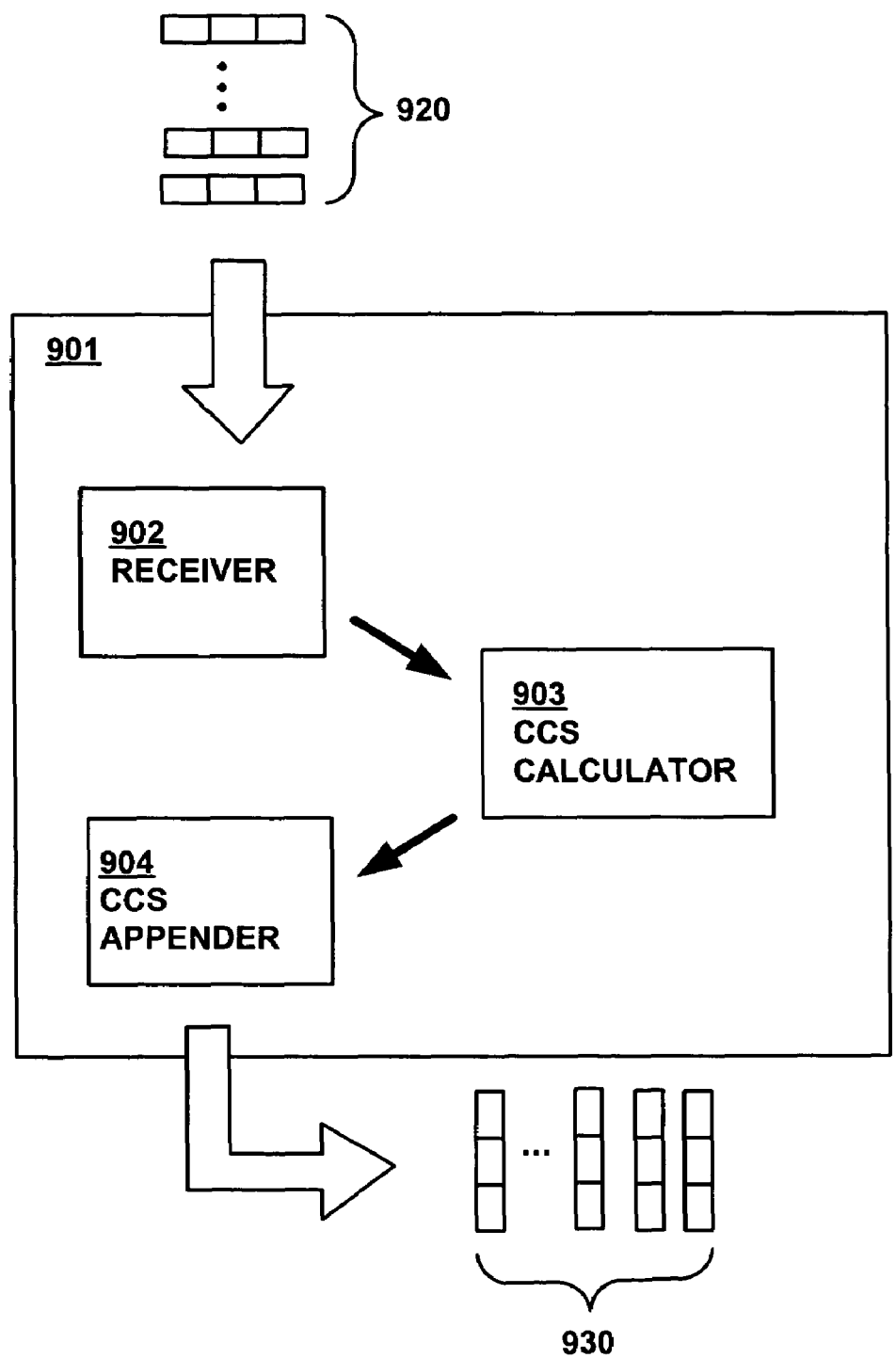
FIG. 9 illustrates an apparatus for calculating cryptographic checksums across packets in accordance with an embodiment of the present invention.

FIG. 9 is a block diagram of an apparatus for calculating cryptographic checksums across packets in accordance with an embodiment of the present invention. Apparatus 901 comprises a receiver 902 which receives data stream 920. Cryptographic checksums are calculated by cryptographic checksum calculator 903 based on various criteria. Some of these are available bandwidth, available computational capability, security needs, the importance of data contained in the data stream, and the like.

Apparatus 901 also includes a cryptographic checksum (CCS) appender 904 for appending or concatenating, or otherwise assembling, packets of cryptographic checksums and data segments. Appender 904 is, in some embodiments, enabled to concatenate: data segments with cryptographic checksum segments; data segments with other data segments; and cryptographic checksums with each other. Appender 904 assembles or appends to or concatenates, in this embodiment, packets comprising cryptographic checksums calculated for data stream 930, which includes the data segments received by receiver 902 as well as cryptographic checksums calculated by cryptographic checksum calculator 903. It should be noted that embodiments of the present invention are also applicable to previously encrypted data. That is, the present invention is well suited to an embodiment which calculates the cryptographic checksum for data that was previously encrypted (perhaps by another party). In so doing, the present embodiment enables integrity verification even for data encrypted by another party.

Figure 10A:
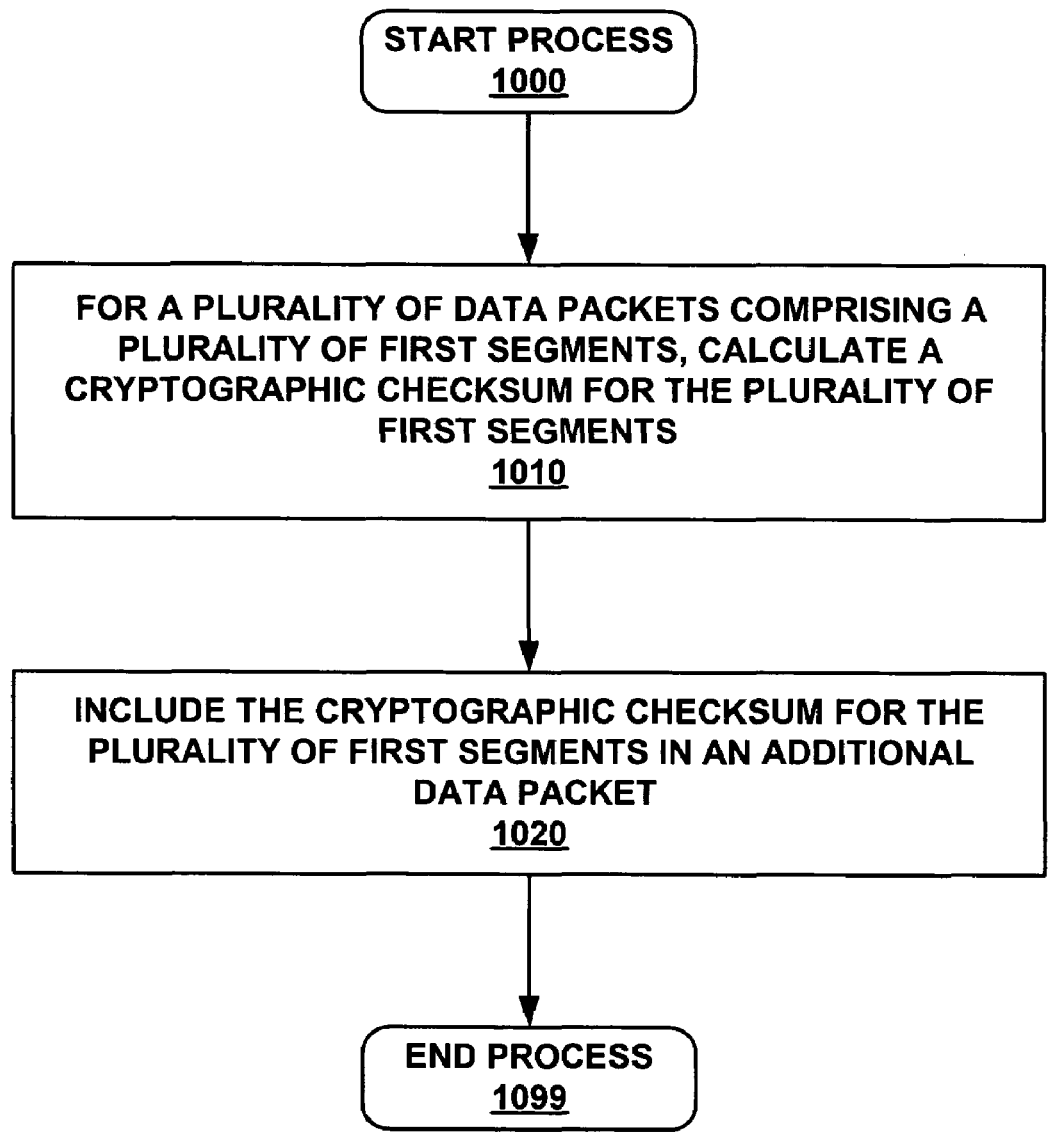
FIG. 10A is a flow diagram illustrating the calculation of a cryptographic checksum across packets in accordance with an embodiment of the present invention.

FIG. 10A is a flow chart illustrating the operation of an embodiment of the present invention. In FIG. 10, process 1000 commences at 1010 by calculating a cryptographic checksum for a plurality of first data segments in a plurality of data packets. The cryptographic checksum can be calculated by CCS calculator 903, above. The calculation can be by any known function that enables data integrity and/or encryption verification. It is noted again that data integrity includes the trust of the source of data as well as the data content. One function of integrity checking is ensuring that an avowed data source is, in fact, the data source.

At 1020, the present embodiment of the present invention includes the cryptographic checksums in an additional packet. In other embodiments, cryptographic checksums can be appended to packets containing data whose integrity requires verification as well as to stand-alone packets. The ability to include cryptographic checksums in stand-alone packets enables a data stream to remain unmodified yet be capable of ensuring data integrity and security. Process 1000 ends at 1099.

The calculation and inclusion of the cryptographic checksum, it is noted, can occur at differing rates for different data segments and packets. This allows different data segments, in either the same data packet or in different data packets, to have different priorities or different integrity checking requirements. As an example, data stream comprising an MPEG encoded video clip may have data segments comprising I, P and B-frames. The I-frames have the highest priority and are not generally truncated or transcoded. P-frames have the next highest priority and are seldom truncated or transcoded. B-frames have the lowest priority and are most commonly truncated or transcoded. If integrity of the video clip is critical and there is also a need to truncate all but the I-frames, cryptographic checksums can be calculated frequently enough for the I-frames to be verified and more frequently for the P- and B-frames to enable frequent truncation. If, on the other hand, if frames are seldom truncated, cryptographic checksums for the I-frames can be calculated more frequently in order to ensure their integrity and cryptographic checksums for the P and B-frames can be calculated less frequently, as integrity checking demands. An important class of applications where it can be beneficial to employ different levels of integrity checking are those which use scalable (or progressive or embedded) compression algorithms for speech, audio, image, video, computer graphics, or other types of media. Example of these scalable compression algorithms include JPEG-2000 with spatial, frequency, SNR (amplitude), region of interest, or color plane scalability; MPEG-1/2/4 or H.261/2/3/4 using spatial, temporal, or SNR (amplitude), region of interest (ROI) or object scalability or fine-grain scalability (FGS); scalable advanced audio coding (scalable AAC); object-based audio coding using MPEG-4 synthetic audio for individual compression and composition of multiple audio objects; or progressive/scalable graphics compression. These scalable coding algorithms generally produce a base layer bitstream and one or more enhancement layer bitstreams, and it is often desirable to adapt the integrity checking for each layer. In general, many applications involve different subsets of data with different priorities or requiring different levels of integrity checks, and the degree of integrity checks can therefore be tailored for each subset of data as described above to match the application's requirements. In this way, excessive cryptographic checksum calculation is avoided, preserving both communication bandwidth and computational resources, while still providing the required level of integrity checks.

In addition, in certain applications the available bandwidth or computational resources may vary with time, and the amount of integrity checking may be adapted to exploit additional available resources when they become available. Adapting the amount or frequency of cryptographic checksum calculation in a manner that is dependent on, or at least is cognizant of, available bandwidth or computation, can be called an "opportunistic integrity checking" scheme. Additionally, embodiments in accordance with the present invention are also well suited to altering and/or dynamically selecting the strength of the cryptographic checksum calculation. That is, strength of the cryptographic checksum corresponds to the type (or length) of the cryptographic checksum. In general, a longer cryptographic checksum can provide an integrity check that has a higher probability of being accurate than does a shorter cryptographic checksum. Hence, adapting the strength of the cryptographic checksum calculation in a manner that is dependent on, or at least is cognizant of, available bandwidth or computation, can also be referred to as an "opportunistic integrity checking" scheme.

Figure 10B:
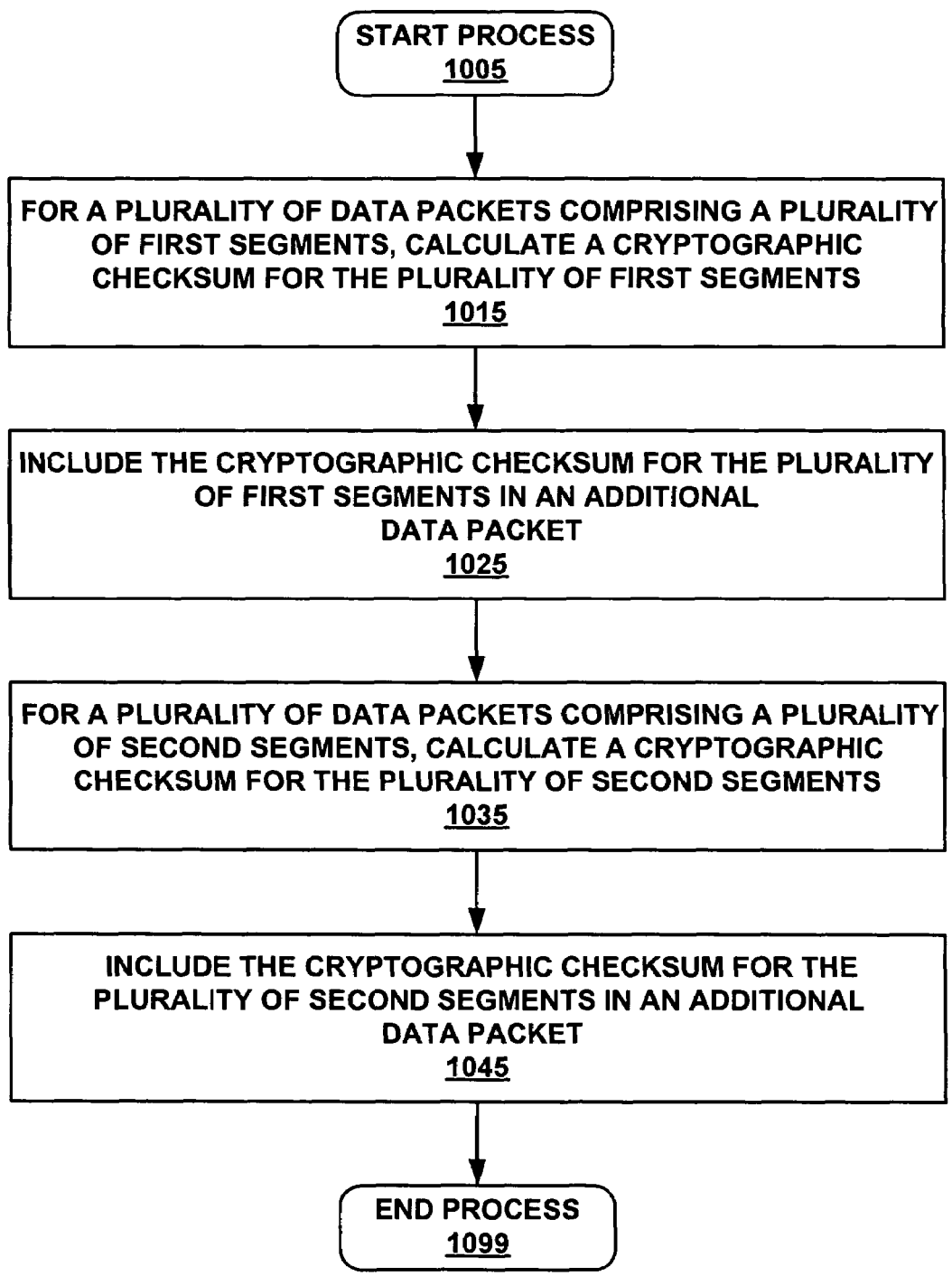
FIG. 10B is a flow diagram illustrating the calculation of a cryptographic checksum across packets comprising multiple segments in accordance with an embodiment of the present invention.

FIG. 10B illustrates the operation of an embodiment of the present invention where there are multiple segments within a plurality of packets and more than one cryptographic checksum is necessary to achieve the level of data integrity and security required. Here, again, a cryptographic checksum is calculated at 1015 for a plurality of first segments in a plurality of data packets. As noted above, packets can comprise many types of data and many types and numbers of data segments. In the present embodiment, packets are not limited to any specific number of segments.

At step 1025, the cryptographic checksum is included at 1025 in an additional packet. Inclusion of a cryptographic checksum can be as an appending to a previously defined packet which can comprise data or other cryptographic checksums, or a combination of types. Inclusion can be accomplished by CCS appender 904 discussed above.

At 1035, a cryptographic checksum is calculated for a plurality of second segments in a plurality of data packets. The term "second," as discussed further below, does not imply a priority or an order of cryptographic checksum calculation. The term is used here solely to distinguish groups of data segments. Again, the cryptographic checksum can be calculated by CCS calculator 903, as discussed earlier.

The second cryptographic checksum is included in an additional data packet at 1045, and again it can be appended or concatenated by CCS appender 904. It is noted that embodiments of the present invention are enabled to include the different cryptographic checksums in either the same data packet or in different data packets. It is also noted that "first" and "second," as used herein, are not meant to indicate a specific order of segments in a data packet nor any prioritization of cryptographic checksum calculation. The terms are used here to imply the grouping of segment types. Thus, if there are additional segments (e.g. more than two segments) then the additional segments are processed in a similar manner. Hence, at the completion of step 1045 of FIG. 10B, when there are more than two segments, the present invention is well suited to returning to step 1035 and repeating the process of FIG. 10B as is necessary.

Figure 11:
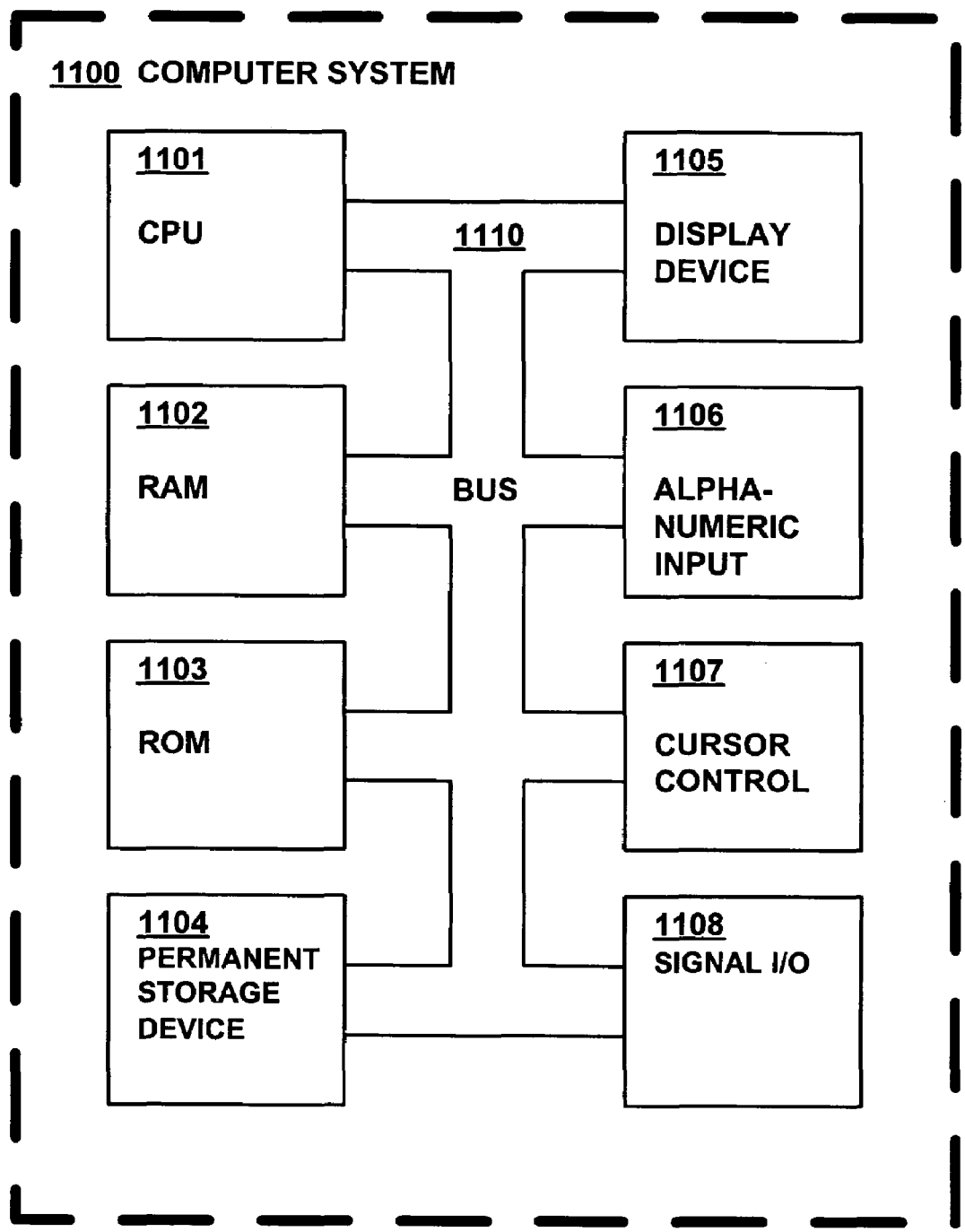
FIG. 11 illustrates an exemplary computer system in accordance with embodiments of the present invention.

Embodiments of the present invention are expected to operate in a computer system. A configuration typical to a generic computer system is illustrated, in block diagram form, in FIG. 11. Generic computer 1100 is characterized by a processor 1101, connected electronically by a bus 1110 to a volatile memory 1102, a non-volatile memory 1103, possibly some form of data storage device 1104 and a display device 1105. It is noted that display device 1105 can be implemented in different forms. While a video CRT or LCD screen is common, this embodiment can be implemented with other devices or possibly none. Bus 1110 also connects a possible alpha-numeric input device 1106, cursor control 1107, and, importantly in the context of embodiments of the present invention involved in the transmission, transcoding and reception of streamed media, communication I/O device 1108. In various implementations, communication I/O device 1108 may be realized as a modem, an Ethernet connection, a wireless device, or any other means of communicating signals between a computer system and a communications network. An alpha-numeric input device 1106 may be implemented as any number of possible devices, but is commonly implemented as a keyboard.

Figure 12:
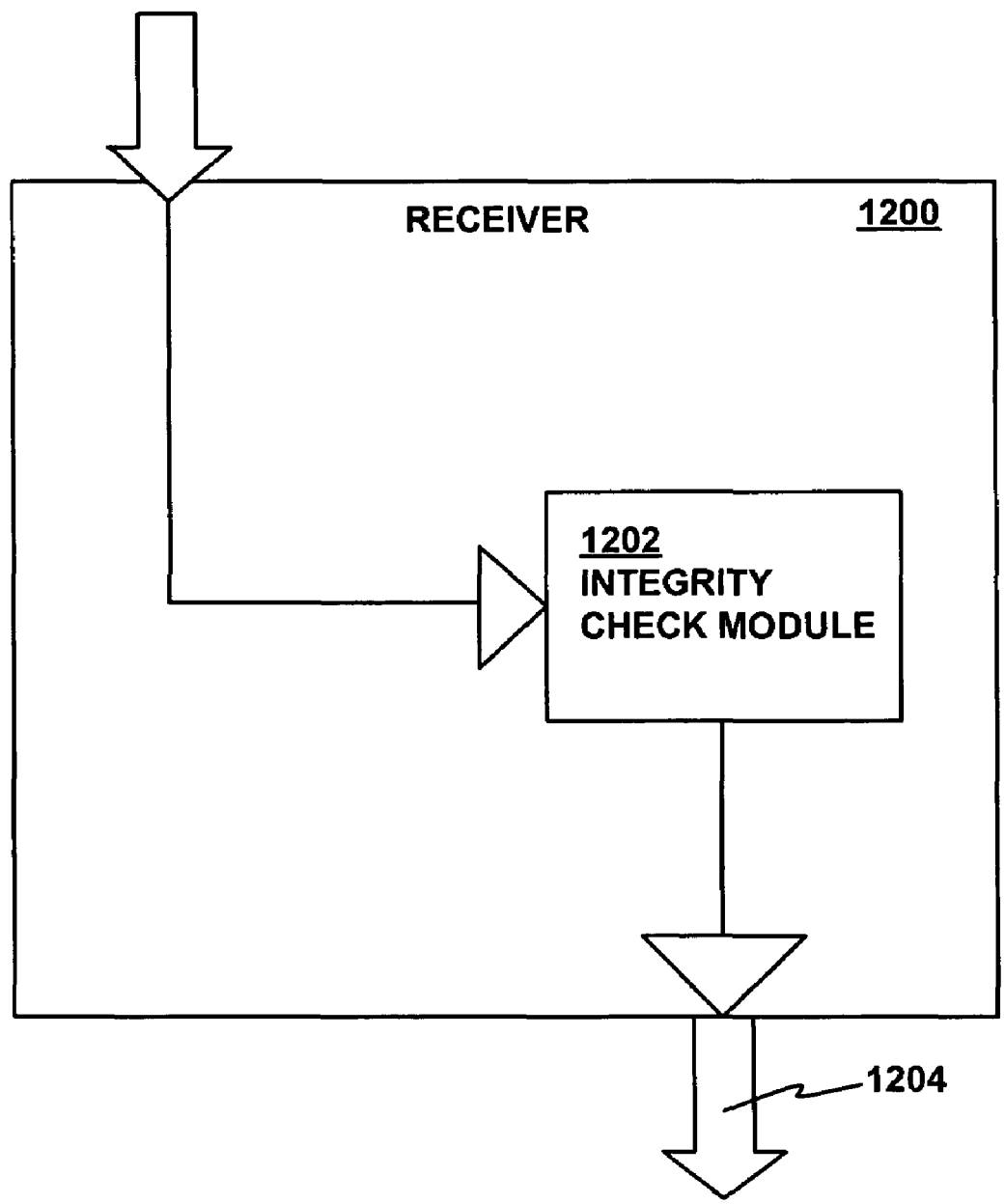
FIG. 12 is a schematic diagram of a receiver having an integrity check module in accordance with an embodiment of the present invention.

Referring now to FIG. 12, a schematic diagram of a receiver 1200 having an integral integrity check module 1202 is shown. In operation, receiver 1200 receives potentially processed data packets, and the integrity check module 1202 checks the integrity of the packets by computing the cryptographic checksums for the received data packets (i.e. a new cryptographic checksum) and compares it to the received cryptographic checksums (e.g., previously determined cryptographic checksum). More specifically, receiver 1200 receives, for example, packets comprising cryptographic checksums calculated for data stream 930, which includes the data segments received by receiver 902 as well as cryptographic checksums calculated by cryptographic checksum calculator 903 all of FIG. 9. In one embodiment, if the received cryptographic checksums match the cryptographic checksum calculated by integrity check module 1202, integrity check module 1202 indicates that the cryptographic checksums match. Conversely, if the received cryptographic checksums differ from the cryptographic checksum calculated by integrity check module 1202, integrity check module 1202 indicates that the cryptographic checksums do not match. In one embodiment, the indication of the matching or differing result is provided externally to a user via, for example, output 1204.

Hence, embodiments of the present invention are comprised of various components. That is, in one embodiment, the present invention is comprised of a unit (e.g. apparatus 901 of FIG. 9) which, given data segments, computes the appropriate cryptographic checksums and assembles the associated data packets for transmission. The present embodiment is further comprised a transcoding or data manipulation module. Additionally, the present embodiment is comprised of a receiver (e.g. receiver 1200) which performs the integrity check on the received (possibly) manipulated or transcoded data packet in order to verify the integrity of the data packet. it should be understood that the term receiver is used to describe a plurality of components in the present application. For example, in FIG. 9, apparatus 901 includes a receiver 902 which receives data stream 920. Additionally, FIG. 12 includes a receiver 1200 for receiving data packets and corresponding cryptographic checksums which have been transmitted, for example, from apparatus 901 of FIG. 9. Accordingly, embodiments of the present invention provide methods and systems to enable a potentially untrusted transcoder within a network to transcode a media stream while still preserving the end-to-end security of the rest of the stream. Specifically, disclosed are methods and systems for computing and performing the cryptographic checksum such that as long as the potentially untrusted node (e.g. transcoder) performs the transcoding or data manipulation in the appropriate manner, the receiver is still able to validate that the potentially untrusted node performed the transcoding or data manipulation in the appropriate manner, and the receiver is still able to validate the integrity of the transmitted data and any encryption of the transmitted data remains uncompromised.

Furthermore, embodiments of the present invention are also useful for ensuring the integrity of transcoded or modified unencrypted data. Specifically, disclosed are methods and systems for computing and performing the cryptographic checksum such that as long as the potentially untrusted node performs the transcoding or data manipulation in the appropriate manner, the receiver is still able to validate that the potentially untrusted node performed the transcoding or data manipulation in the appropriate manner. That is, the receiver is still able to validate the integrity of the transmitted data, and that the transcoding or modification of the data was performed in an appropriate and acceptable manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A method for ensuring the integrity of data, comprising:
for a plurality of data packets comprising a plurality of first data segments and a plurality of second data segments, calculating cryptographic checksums for said plurality of said first data segments, such that a data packet of said plurality of data packets is associated with a plurality of said cryptographic checksums, wherein said plurality of first data segments have a different priority than said plurality of second data segments; and
enabling said cryptographic checksums for said plurality of said first data segments to be transmitted separately from said plurality of data packets.

2. The method described in claim 1 further comprising:
calculating cryptographic checksums for said plurality of said second data segments; and
enabling said cryptographic checksums for said plurality of said second data segments to be transmitted separately from said plurality of data packets.

3. The method described in claim 2 further comprising:
including said cryptographic checksums for said plurality of said first data segments and said cryptographic checksums for said plurality of said second data segments in the same data packet.

4. The method described in claim 1 wherein said cryptographic checksums for said plurality of said first data segments are calculated at a rate which is different from the rate at which said cryptographic checksums for said plurality of said second data segments are calculated.

5. The method described in claim 1 wherein said calculating of said cryptographic checksums utilizes an opportunistic integrity checking scheme.

6. The method described in claim 1 wherein said calculating of said cryptographic checksums is performed using a technique selected from the group consisting of:
a hash function providing a fingerprint of data contained in an encrypted data packet and which guarantees the authenticity of received data and the validity of decrypted data, Message Authentication Codes (MAC), Message Digest algorithms, keyed hashes, SHA (Secure Hash Algorithm), RIPEMD (RACE Integrity Primitives Evaluation Message Digest), HMAC (keyed-Hashing for Message Authentication), and digital signature schemes.

7. The method described in claim 1 wherein said plurality of said data packets comprises secure scalably streamable data.

8. The method described in claim 1 wherein said plurality of said data packets include data comprising scalably compressed data for media selected from the group consisting of: speech, audio, image, video, and computer graphics.

9. The method described in claim 1 wherein said plurality of said data packets include data scalably formatted according to techniques selected from the group consisting of:
JPEG-2000 with spatial, frequency, SNR (amplitude), region of interest, or color plane scalability; MPEG-1/2/4 or H.261/2/3/4 using spatial, temporal, or SNR (amplitude), region of interest (ROI) or object scalability or fine-grain scalability (FGS); scalable advanced audio coding (scalable AAC); object-based audio coding using MPEG-4 synthetic audio for individual compression and composition of multiple audio objects; and progressive/scalable graphics compression.

10. The method described in claim 1 wherein said plurality of said data packets comprises media data.

11. The method described in claim 1 wherein said data is stored in a storage medium.

12. The method described in claim 1 further comprising:
encrypting one or more of said data packets.

13. The method described in claim 1 further comprising:
encrypting said cryptographic checksums.

14. A computer readable medium having instructions stored therein for implementing a method for ensuring integrity of data, comprising:

for a plurality of data packets comprising a plurality of first data segments and a plurality of second data segments, calculating cryptographic checksums for said plurality of said first data segments, such that a data packet of said plurality of data packets is associated with a plurality of said cryptographic checksums, wherein said plurality of first data segments have a different priority than said plurality of second data segments; and enabling said cryptographic checksums for said plurality of said first data segments to be transmitted separately from said plurality of said data packets.

15. The computer readable medium described in claim 14 wherein said instructions further comprise:

calculating cryptographic checksums for said plurality of said second data segments; and enabling said cryptographic checksums for said plurality of said second data segments to be transmitted separately from said plurality of said data packets.

16. The computer readable medium described in claim 15 wherein said instructions further comprise:

including said cryptographic checksums for said plurality of said first data segments and said cryptographic checksums for said plurality of said second data segments in the same data packet.

17. The computer readable medium described in claim 14 wherein said cryptographic checksums for said plurality of said first data segments are calculated at a rate which is different from the rate at which said cryptographic checksums for said plurality of said second data segments are calculated.

18. The computer readable medium described in claim 14 wherein said data packets comprise secure scalably streamable data.

19. The computer readable medium described in claim 14 wherein said data packets comprise media data.

20. The computer readable medium described in claim 14 wherein said data is stored in a storage medium.

21. The computer readable medium described in claim 14 wherein said instructions further comprise:

encrypting one or more of said data packets.

22. The computer readable medium described in claim 14 wherein said instructions further comprise:

encrypting said cryptographic checksums.

23. An apparatus for ensuring integrity of data, comprising:

a receiver for receiving a first plurality of data packets and a second plurality of data packets, each of said packets comprising a plurality of data segments, wherein data segments of said plurality of first data packets have a different priority than data segments of said plurality of second data packets;

a cryptographic checksum calculator coupled to said receiver, said cryptographic checksum calculator for calculating a cryptographic checksum for each of said data segments; and a cryptographic checksum appender coupled to said cryptographic checksum calculator for assembling said cryptographic checksum.

24. The apparatus described in claim 23 wherein said cryptographic checksum calculator is enabled to for a plurality of data packets comprising said plurality of first data segments and said plurality of second data segments, calculate a cryptographic checksum for said plurality of said first data segments; and to enable said cryptographic checksum for said plurality of said first data segments to be transmitted separately from said plurality of data packets.

25. The apparatus described in claim 24 wherein said cryptographic checksum calculator is enabled to calculate said cryptographic checksum for said set of said data segments independently of cryptographic checksums calculated for other sets of said data segments.

26. The apparatus described in claim 23, further comprising a forwarder for forwarding said packets to a destination.

27. A method for ensuring integrity of data, comprising:

receiving a data packet comprising an amount of data partitioned into a plurality of data segments;

calculating a cryptographic checksum for each of a first of said plurality of data segments, wherein said first of said plurality of data segments has a different priority than at least a second of said plurality of data segments; and enabling said cryptographic checksum for each of said first of said plurality of data segments to be transmitted separately from said data packet.

28. The method described in claim 27 further comprising:

calculating a second cryptographic checksum, wherein a second cryptographic checksum is computed for said second of said plurality of data segments, said first of said plurality of data segments, and said cryptographic checksum for said first of said plurality of data segments.

29. A method for ensuring integrity of data, comprising:

receiving a data packet comprising an amount of data partitioned into at least a plurality of first data segments and a second data segment, wherein said plurality of first data segments has a different priority than said second data segment;

calculating a cryptographic checksum for each of said plurality of first data segments; and enabling said cryptographic checksums for each of said plurality of first data segments to be transmitted separately from said data packet.

30. The method described in claim 29 further comprising: calculating a second cryptographic checksum for said second data segment; and enabling said cryptographic checksum for said second data segment to be transmitted separately from said data packet.

31. The method described in claim 29 wherein said cryptographic checksums and said second cryptographic checksum are transmitted in a common data packet.

32. An apparatus for verifying the integrity of data, said apparatus comprising:

a receiver, said receiver configured to receive first data packet, second data packet, and a previously determined cryptographic checksum packet corresponding to said first data packet, wherein said cryptographic checksum packet comprises a plurality of cryptographic checksum associated with said first data packet, wherein said first data packet has a different priority than said second data packet; and an integrity check module coupled to said receiver, said integrity check module configured to calculate a new cryptographic checksum corresponding to said received first data and to determine whether said new cryptographic checksum matches said previously determined cryptographic checksum.

33. The apparatus of claim 32 wherein said integrity check module is integral with said receiver.

34. The apparatus of claim 32 further comprising:

an output coupled to said integrity check module, said output configured to provide an indication of whether said new cryptographic checksum matches said previously determined cryptographic checksum.

* * * * *